United States Patent
Park et al.

(10) Patent No.: US 10,158,465 B2
(45) Date of Patent: Dec. 18, 2018

(54) METHOD FOR TRANSCEIVING SIGNAL IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Yunjung Yi, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/125,565

(22) PCT Filed: Apr. 7, 2015

(86) PCT No.: PCT/KR2015/003462
§ 371 (c)(1),
(2) Date: Sep. 12, 2016

(87) PCT Pub. No.: WO2015/156574
PCT Pub. Date: Oct. 15, 2015

(65) Prior Publication Data
US 2017/0005764 A1    Jan. 5, 2017

Related U.S. Application Data

(60) Provisional application No. 61/981,200, filed on Apr. 18, 2014, provisional application No. 61/977,643, filed on Apr. 10, 2014.

(51) Int. Cl.
*H04L 5/00* (2006.01)
*H04W 8/00* (2009.01)
(Continued)

(52) U.S. Cl.
CPC .......... *H04L 5/0048* (2013.01); *H04J 11/005* (2013.01); *H04L 5/006* (2013.01);
(Continued)

(58) Field of Classification Search
None
See application file for complete search history.

(56) References Cited

U.S. PATENT DOCUMENTS 9,942,016 B2 * 4/2018 Liu .......................... H04L 5/005
9,979,524 B2 * 5/2018 Kim ....................... H04L 5/0051
(Continued)

OTHER PUBLICATIONS

Ericsson, "Design of Discovery Bursts and Procedures," 3GPP TSG-RAN WG1 #76, R1-141642, Apr. 2014, 8 pages.
(Continued)

*Primary Examiner* — Hicham B Foud
(74) *Attorney, Agent, or Firm* — Lee Hong Degerman Kang Waimey

(57) ABSTRACT

Disclosed is a method for a terminal and a transmission point (TP) for transceiving a reference signal in a wireless communication system. The method according to an embodiment of the present invention comprises receiving a discovery reference signal (DRS) from a second TP by using a DRS configuration acquired from a first TP which shares a single physical cell ID with the second TP; and activating a connection to the second TP without a radio resource control (RRC) reconfiguration in accordance with the results of radio resource management (RRM) measurements of the DRS.

8 Claims, 17 Drawing Sheets

(51) Int. Cl.
  *H04W 72/04*    (2009.01)
  *H04J 11/00*    (2006.01)
  *H04W 48/12*    (2009.01)
  *H04W 76/27*    (2018.01)
  *H04W 76/15*    (2018.01)
  *H04W 48/16*    (2009.01)

(52) U.S. Cl.
  CPC .......... *H04L 5/0051* (2013.01); *H04L 5/0057* (2013.01); *H04W 8/005* (2013.01); *H04W 48/12* (2013.01); *H04W 72/042* (2013.01); *H04W 48/16* (2013.01); *H04W 76/15* (2018.02); *H04W 76/27* (2018.02)

(56) References Cited

U.S. PATENT DOCUMENTS

| | | | |
|---|---|---|---|
| 9,991,983 B2* | 6/2018 | Seo | H04W 76/14 |
| 10,004,030 B2* | 6/2018 | Liu | H04W 48/12 |
| 2010/0027456 A1* | 2/2010 | Onggosanusi | H04B 7/024 370/312 |
| 2011/0151878 A1* | 6/2011 | Xu | H04W 48/10 455/444 |
| 2012/0281567 A1* | 11/2012 | Gao | H04B 7/0626 370/252 |
| 2013/0028180 A1 | 1/2013 | Gao et al. | |
| 2013/0083681 A1* | 4/2013 | Ebrahimi Tazeh Mahalleh | H04L 5/0057 370/252 |
| 2013/0250880 A1* | 9/2013 | Liao | H04W 72/042 370/329 |
| 2013/0301542 A1* | 11/2013 | Krishnamurthy | H04W 52/50 370/329 |
| 2014/0314000 A1* | 10/2014 | Liu | H04W 72/042 370/329 |
| 2014/0321313 A1* | 10/2014 | Seo | H04J 11/00 370/252 |
| 2015/0092768 A1* | 4/2015 | Ng | H04W 48/16 370/350 |
| 2015/0271744 A1* | 9/2015 | Liu | H04L 5/005 370/329 |
| 2015/0334609 A1* | 11/2015 | Waldhauser | H04W 36/0061 455/436 |
| 2016/0066255 A1* | 3/2016 | Marinier | H04W 48/16 370/350 |
| 2016/0195601 A1* | 7/2016 | Siomina | G01S 5/0205 455/456.1 |
| 2017/0078062 A1* | 3/2017 | Park | H04B 7/26 |

OTHER PUBLICATIONS

LG Electronics, "Discussion on high-layer signaling for NAICS," 3GPP TSG-RAN WG1 #76, R1-141361, Apr. 2014, 7 pages.

Samsung, "Discussions on small cell discovery procedure," 3GPP TSG-RAN WG1 #76, R1-141289, Apr. 2014, 4 pages.

3rd Generation Partnership Project (3GPP), "Technical Specification Group Radio Access Network; Coordinated multi-point operation for LTE physical layer aspects (Release 11)," 3GPP TR 36.819 V11.1.0, Dec. 2011, 69 pages.

PCT International Application No. PCT/KR20151003462, Written Opinion of the International Searching Authority dated Jul. 16, 2015, 20 pages.

* cited by examiner

FIG. 2
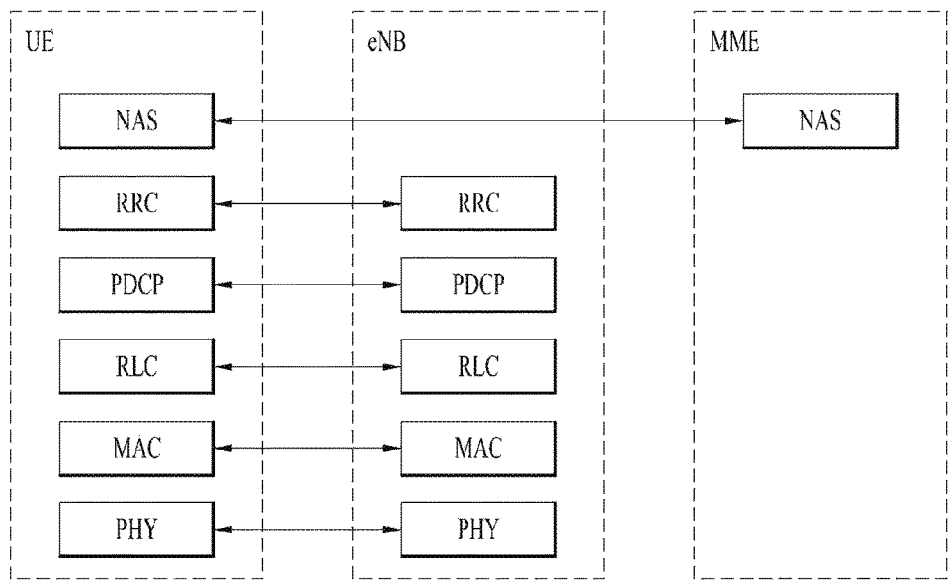
(a) Control-Plane Protocol Stack
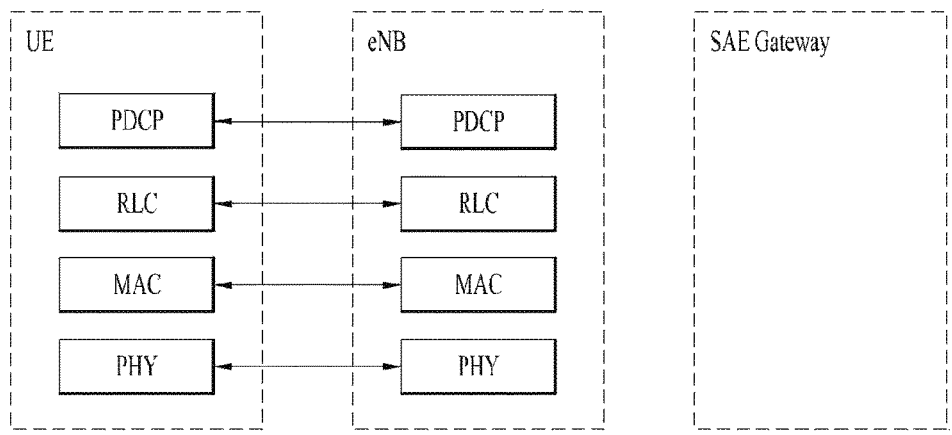
(b) User-Plane Protocol Stack

☒ : DMRS GROUP 1

☒ : DMRS GROUP 2

FIG. 14

```
RadioResourceConfigDedicatedSCell-r10 ::=   SEQUENCE {
    -- UE specific configuration extensions applicable for an SCell
    physicalConfigDedicatedSCell-r10      PhysicalConfigDedicatedSCell-r10    OPTIONAL,    -- Need ON
    ...,
    [[ mac-MainConfigSCell-r11            MAC-MainConfigSCell-r11             OPTIONAL     -- Cond SCellAdd
    ]]
}
```

```
PhysicalConfigDedicatedSCell-r10 ::=    SEQUENCE {
    -- DL configuration as well as configuration applicable for DL and UL
    radioLinkConfiguration-r10
    antennaInfo-r10                                                    OPTIONAL, -- Need ON
    crossCarrierSchedulingConfig-r10                                   OPTIONAL
Need ON
    csi-RS-Config-r10                                                  OPTIONAL, -- Need ON        1302_1_1
    pdsch-ConfigDedicated-r10                                          OPTIONAL  -- Need ON
                                                                       OPTIONAL  -- Cond SCellAdd
    -- UL configuration
    ul-Configuration-r10                  SEQUENCE {
        antennaInfoUL-r10                                              OPTIONAL, -- Need ON
        pusch-ConfigDedicatedSCell-r10                                 OPTIONAL  -- Need ON
Need ON
        uplinkPowerControlDedicatedSCell-r10                           OPTIONAL,
-- Need ON
        cqi-ReportConfigSCell-r10                                      OPTIONAL, -- Need ON        1302_1_2
        soundingRS-UL-ConfigDedicated-r10                              OPTIONAL  -- Need ON
ON
        soundingRS-UL-ConfigDedicated-v1020
        soundingRS-UL-ConfigDedicatedAperiodic-r10                     OPTIONAL  -- Need ON
                                                                       OPTIONAL  -- Cond CommonUL
    },
    [[  -- DL configuration as well as configuration applicable for DL and UL
        csi-RS-ConfigNZPToReleaseList-r11                              OPTIONAL, -- Need ON
ON      csi-RS-ConfigNZPToAddModList-r11                               OPTIONAL, -- Need ON
ON      csi-RS-ConfigZPToAddModList-r11                                OPTIONAL, -- Need ON
ON      csi-RS-ConfigZPToReleaseList-r11                               OPTIONAL, -- Need ON
ON      csi-RS-ConfigZPToAddModList-r11                                OPTIONAL, -- Need ON
        epdcch-Config-r11                                              OPTIONAL, -- Need ON
        pdsch-ConfigDedicated-v1130                                    OPTIONAL, -- Need ON
        -- UL configuration
        cqi-ReportConfig-v1130                                         OPTIONAL, -- Need ON        1302_1_3
        pusch-ConfigDedicated-v1130                                    OPTIONAL, -- Need ON
        pucch-ConfigDedicated-v1130                                    OPTIONAL  -- Need ON
        uplinkPowerControlDedicated-v1130                              OPTIONAL  -- Cond ULPC
    ]]
}

CSI-RS-ConfigNZPToAddModList-r11 ::= SEQUENCE (SIZE (1..maxCSI-RS-NZP-r11)) OF CSI-RS-ConfigNZP-    1302_1_4
r11
CSI-RS-ConfigNZPToReleaseList-r11 ::= SEQUENCE (SIZE (1..maxCSI-RS-NZP-r11)) OF CSI-RS-ConfigNZPId-
r11
CSI-RS-ConfigZPToAddModList-r11 ::= SEQUENCE (SIZE (1..maxCSI-RS-ZP-r11)) OF CSI-RS-ConfigZP-r11
CSI-RS-ConfigZPToReleaseList-r11 ::= SEQUENCE (SIZE (1..maxCSI-RS-ZP-r11)) OF CSI-RS-ConfigZPId-
r11
```

FIG. 16

```
CQI-ReportConfig-v1130 ::=    SEQUENCE {
    cqi-ReportPeriodic-v1130      CQI-ReportPeriodic-v1130,
    cqi-ReportBoth-r11            CQI-ReportBoth-r11
}                                                                    ⌐ 1302_1_3_1

CQI-ReportBoth-r11 ::=   SEQUENCE {
    csi-IM-ConfigToReleaseList-r11    CSI-IM-ConfigToReleaseList-r11    OPTIONAL,  -- Need ON
    csi-IM-ConfigToAddModList-r11     CSI-IM-ConfigToAddModList-r11     OPTIONAL,  -- Need ON
    csi-ProcessToReleaseList-r11      CSI-ProcessToReleaseList-r11      OPTIONAL,  -- Need ON
    csi-ProcessToAddModList-r11       CSI-ProcessToAddModList-r11       OPTIONAL   -- Need ON
}

CSI-IM-ConfigToAddModList-r11 ::=   SEQUENCE (SIZE (1..maxCSI-IM-r11)) OF CSI-IM-Config-r11
CSI-IM-ConfigToReleaseList-r11 ::=  SEQUENCE (SIZE (1..maxCSI-IM-r11)) OF CSI-IM-ConfigId-r11
CSI-ProcessToAddModList-r11 ::=     SEQUENCE (SIZE (1..maxCSI-Proc-r11)) OF CSI-Process-r11
CSI-ProcessToReleaseList-r11 ::=    SEQUENCE (SIZE (1..maxCSI-Proc-r11)) OF CSI-ProcessId-r11
```

```
-- ASN1START

CSI-RS-ConfigNZP-r11 ::=       SEQUENCE {
    csi-RS-ConfigNZPId-r11        CSI-RS-ConfigNZPId-r11,
    antennaPortsCount-r11         ENUMERATED { an1, an2, an4, an8 },
    resourceConfig-r11            INTEGER ( 0 .. 31 ),
    subframeConfig-r11            INTEGER ( 0 .. 154 ),
    scramblingIdentity-r11        INTEGER ( 0 .. 503 ),
    qcl-CRS-Info-r11              SEQUENCE {
        qcl-ScramblingIdentity-r11    INTEGER ( 0 .. 503 ),
        crs-PortsCount-r11            ENUMERATED { n1, n2, n4, spare1 },
        mbsfn-SubframeConfigList-r11  CHOICE {
            release                       NULL,
            setup                         SEQUENCE {
                subframeConfigList            MBSFN-SubframeConfigList
            }
        }                                                          OPTIONAL,  -- Need on
    }                                                              OPTIONAL,  -- Need OR
    ...
}

-- ASN1START
```

METHOD FOR TRANSCEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/003462, filed on Apr. 7, 2015, which claims the benefit of U.S. Provisional Application Nos. 61/977,643, filed on Apr. 10, 2014, and 61/981,200, filed on Apr. 18, 2014, the contents of which are all hereby incorporated by reference herein in their entirety.

TECHNICAL FIELD

The present invention relates to a wireless communication system, and more particularly, to a method of transceiving a signal between a terminal and a transmission point in a wireless communication system and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the aforementioned discussion, a method of transmitting and receiving a reference signal in a wireless communication system and an apparatus therefor are proposed in the following.

A technical task of the present invention is not limited by the above-mentioned technical task. The technical task of the present invention can be induced from embodiments in which other technical tasks are disclosed.

Technical Solution

To achieve these and other advantages and in accordance with the purpose of the present invention, as embodied and broadly described, according to one embodiment, a method of receiving a reference signal, which is received by a user equipment in a wireless communication system, includes the steps of receiving a discovery reference signal (DRS) from a second transmission point (TP) using DRS configuration obtained from a first TP, activating a connection with the second TP according to a result of radio resource management (RRM) measurement measured on the DRS, and receiving a feedback reference signal (FB-RS) for measuring channel state information (CSI) from the activated second TP. In this case, if a single physical cell ID is shared between the first TP and the second TP, a connection between the user equipment and the second TP can be activated without radio resource control (RRC) reconfiguration.

To further achieve these and other advantages and in accordance with the purpose of the present invention, according to a different embodiment, a user equipment receiving a reference signal in a wireless communication system includes a receiver configured to receive a discovery reference signal (DRS) from a second transmission point (TP) using DRS configuration obtained from a first TP and a processor configured to activate a connection with the second TP according to a result of radio resource management (RRM) measurement measured on the DRS. In this case, the receiver receives a feedback reference signal (FB-RS) for measuring channel state information (CSI) from the activated second TP and if a single physical cell ID is shared between the first TP and the second TP, a connection between the user equipment and the second TP can be activated without radio resource control (RRC) reconfiguration.

The user equipment includes a receiver configured to receive discovery signal configuration including first CSI-RS (channel state information reference signal) from a base station and a processor configured to perform radio resource management (RRM) measured on a discovery signal based on the discovery signal configuration. In this case, if the discovery signal corresponds to a first CSI-RS received based on the first CSI-RS configuration and a first cell ID included in the CSI-RS configuration corresponds to a second signal different from the first CSI-RS, the processor assumes that the first CSI-RS and the second signal are quasi co-located.

To further achieve these and other advantages and in accordance with the purpose of the present invention, according to a further different embodiment, a method of transmitting a reference signal, which is transmitted by a second transmission point (TP) in a wireless communication system, includes the steps of transmitting a discovery reference signal (DRS) corresponding to DRS configuration to a user equipment, which has obtained the DRS configuration from a first TP, activating a connection with the user equipment according to a result of radio resource management (RRM) measurement measured on the DRS, and transmitting a feedback reference signal (FB-RS) for measuring channel state information (CSI) to the user equipment. In this case, if a single physical cell ID is shared between the first TP and the second TP, a connection between the user equipment and the second TP can be activated without radio resource control (RRC) reconfiguration.

Preferably, the UE can receive a semi-static point switching message from the first TP via a medium access control (MAC) layer and activate the second TP as a secondary cell (SCell) based on the semi-static point switching message.

Preferably, the UE can obtain FB-RS configuration of the second TP corresponding to the FB-RS by changing a parameter of the DRS configuration obtained from the first TP and receive the FB-RS based on the FB-RS configuration of the second TP. And, the UE can receive information on a transmission period, a transmission offset, number of transmission antennas, or quasi co-location (QCL) assumption of the DRS configuration, which is changed to obtain the FB-RS configuration of the second TP, via a MAC layer or a physical layer.

And, the UE can receive information on a first feedback-configuration-index associated with the DRS received from the second TP among a plurality of feedback-configuration-indexes set to the user equipment in advance via radio resource control (RRC) and receive the FB-RS via FB-RS configuration identified by the first feedback-configuration-index.

Preferably, the second TP may belong to a group of a plurality of TPs sharing the single physical cell ID and a plurality of the TPs belonging to the group of the TPs can be activated or deactivated according to a semi-static point switching operation. More preferably, the group of a plurality of the TPs can share at least one of enhance physical downlink control channel (EPDCCH) configuration, channel state information (CSI) report configuration, demodulation reference signal (DMRS) scrambling ID configuration, and a transmission mode.

And, the first TP may correspond to a macro cell of the second TP always operating as a primary cell (PCell) in response to the user equipment or a small cell operating as a secondary cell (SCell) of the user equipment which is deactivated according to activation of the second TP.

Advantageous Effects

According to embodiments of the present invention, it is able to efficiently transceive a reference signal between a terminal and a transmission point.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 14 is a diagram for an example of RRC configuration of an Scell;

FIG. 15 is a diagram for an example of a physical layer configuration of an Scell;

FIG. 16 is a diagram for an example of a CSI report configuration;

FIG. 17 is a diagram for an example of an FB-CSI-RS configuration;

BEST MODE

Mode for Invention

Figure 1:
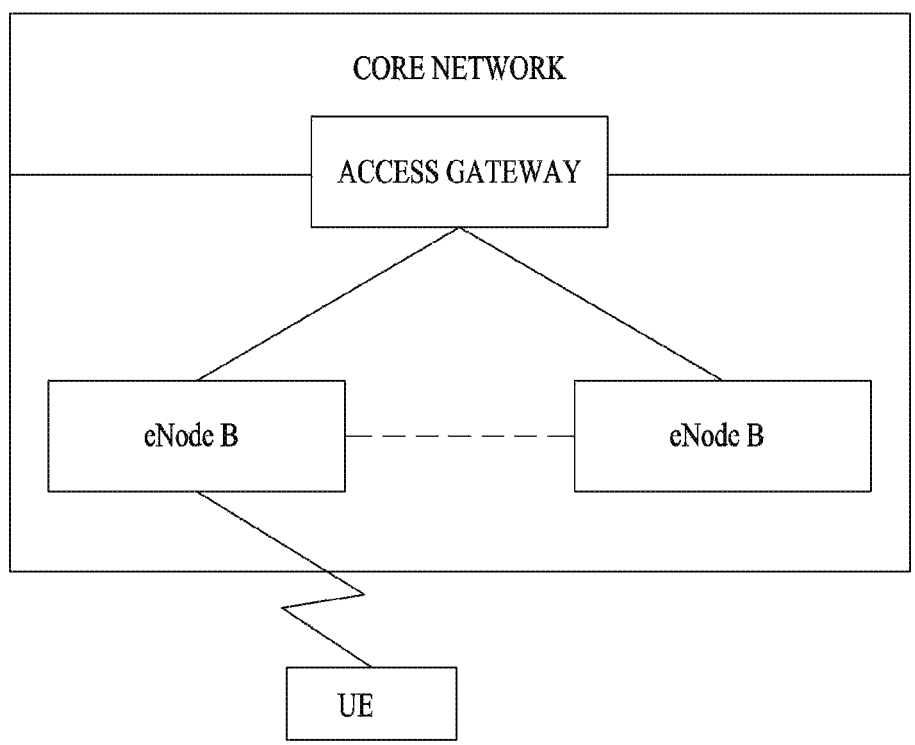
FIG. 1 is a schematic diagram of E-UMTS network structure as one example of a wireless communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, reconfiguration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting a base station eNB is set to one of bandwidths of 1.4, 3.5, 5, 10, 15, and 20 MHz and provides a downlink or uplink transmission service to several UEs. At this time, different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
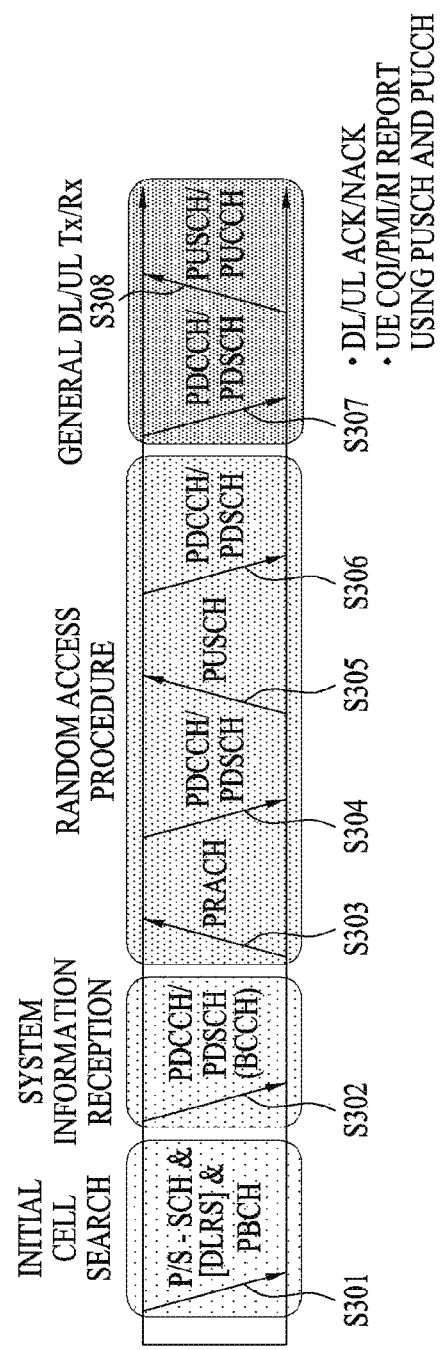
FIG. 3 is a diagram for explaining physical channels used for 3GPP system and a general signal transmission method using the physical channels.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
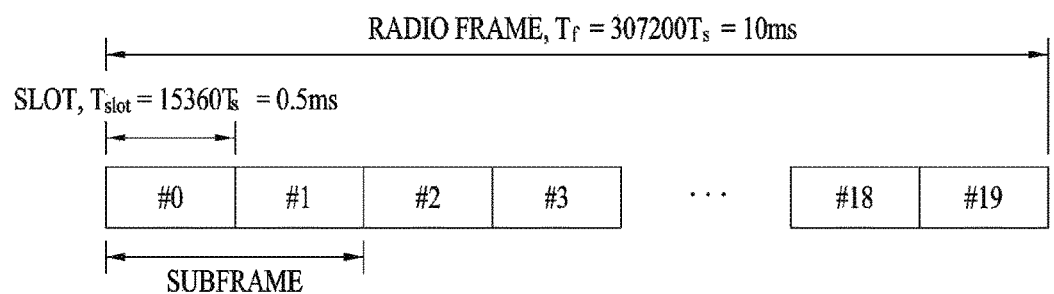
FIG. 4 is a diagram for a structure of a radio frame in LTE system.

FIG. 4 is a diagram illustrating the structure of a radio frame used in an LTE system.

Referring to FIG. 4, the radio frame has a length of 10 ms (327200×$T_s$) and includes 10 equal-sized subframes. Each of the subframes has a length of 1 ms and includes two slots. Each slot has a length of 0.5 ms (15360 $T_s$). In this case, $T_s$ denotes a sampling time represented by $T_s$=1/(15 kHz× 2048)=3.2552×$10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
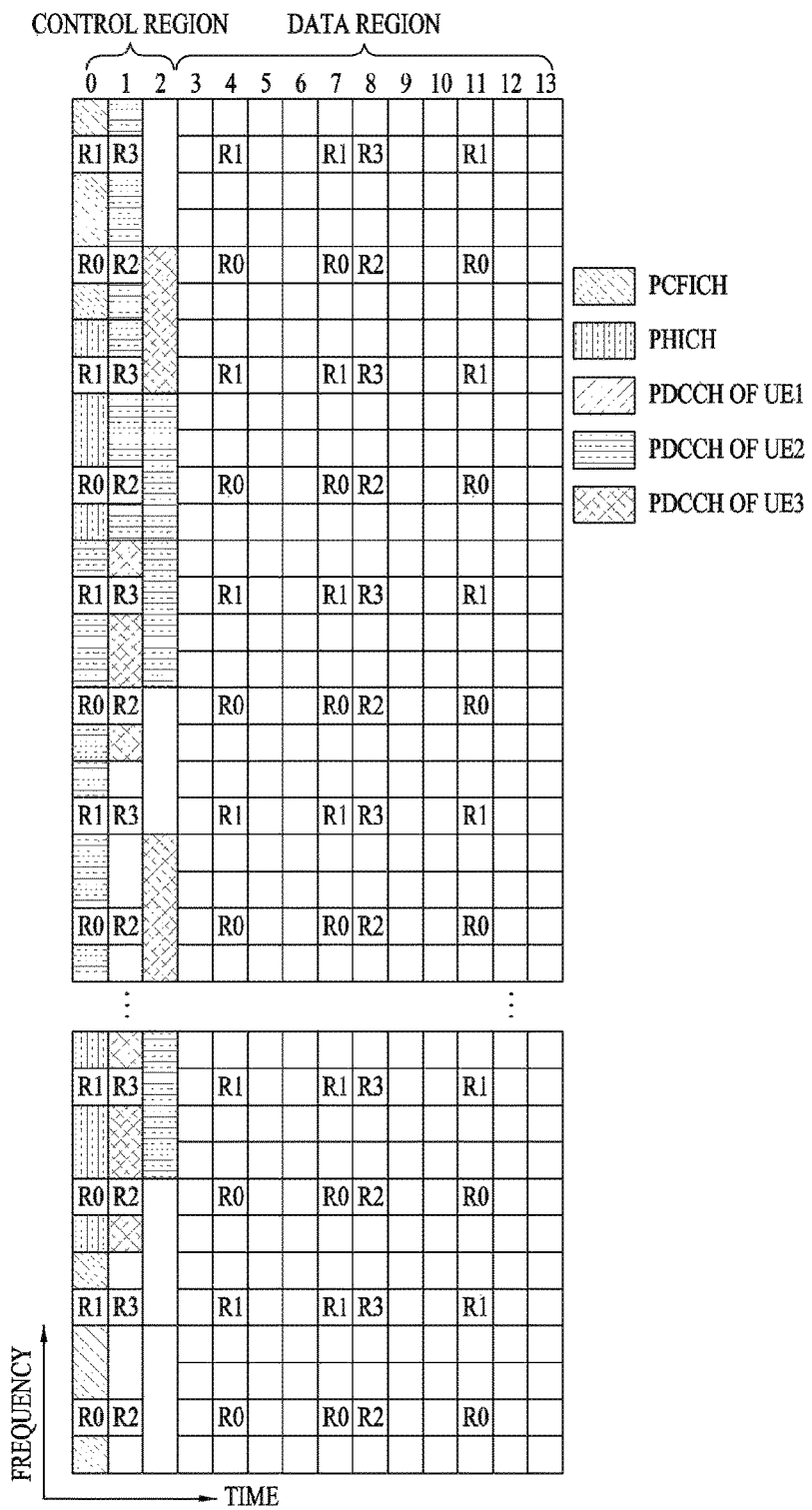
FIG. 5 is a diagram for a structure of a downlink radio frame in LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
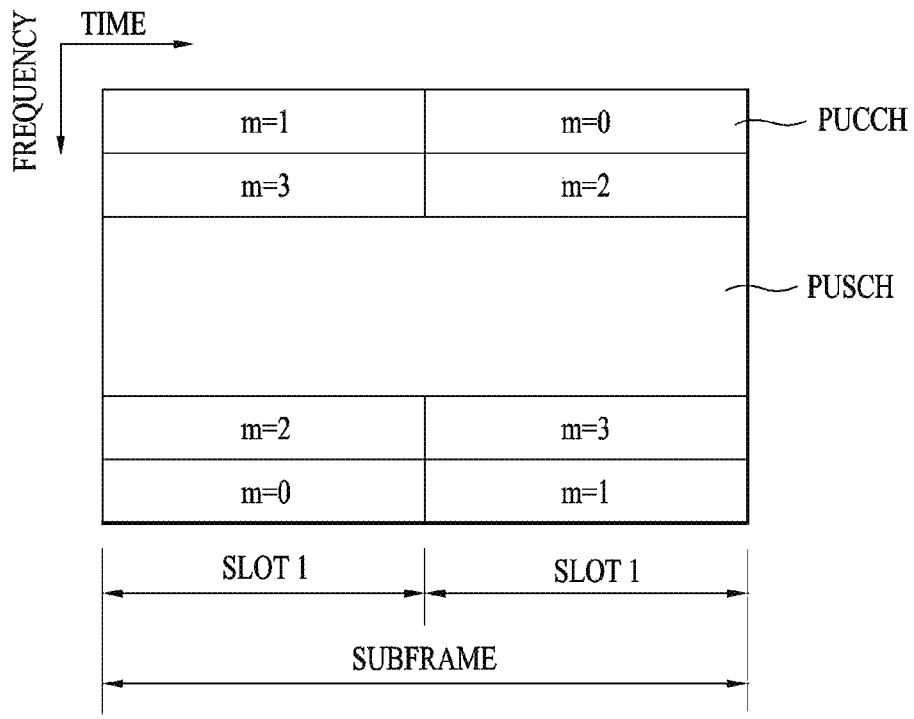
FIG. 6 is a diagram for a structure of an uplink subframe in LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
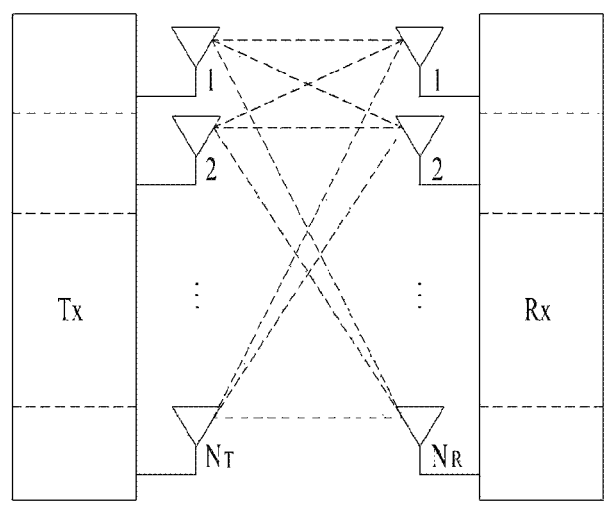
FIG. 7 is a diagram for a configuration of a multiple antenna (MIMO) communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
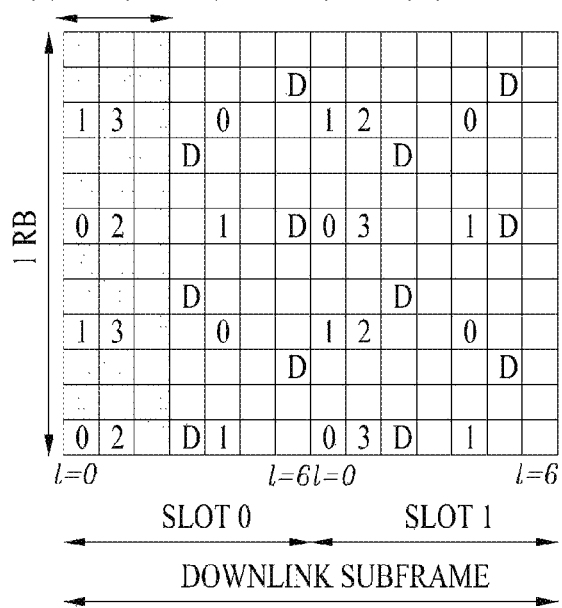
FIG. 8 and FIG. 9 are diagrams for a structure of a downlink reference signal in LTE system supportive of downlink transmission using 4 antennas.
Figure 9:
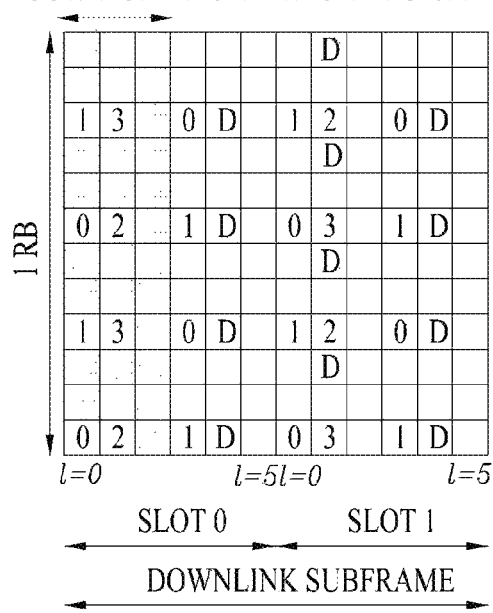

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 8 and 9, the DMRSs are transmitted through antenna port 5. 3GPP TS 36.211 defines DMRSs for a total of eight antenna ports, antenna port 7 to antenna port 14.

Figure 10:
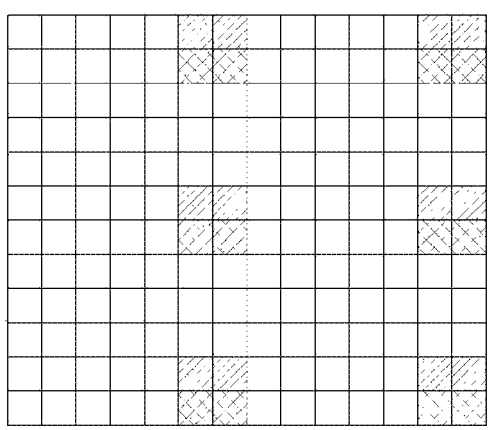
FIG. 10 is a diagram for an example of assigning a downlink DM-RS defined by a current 3GPP standard document.

FIG. 10 illustrates an exemplary DL DMRS allocation defined in a current 3GPP standard specification.

Referring to FIG. 10, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
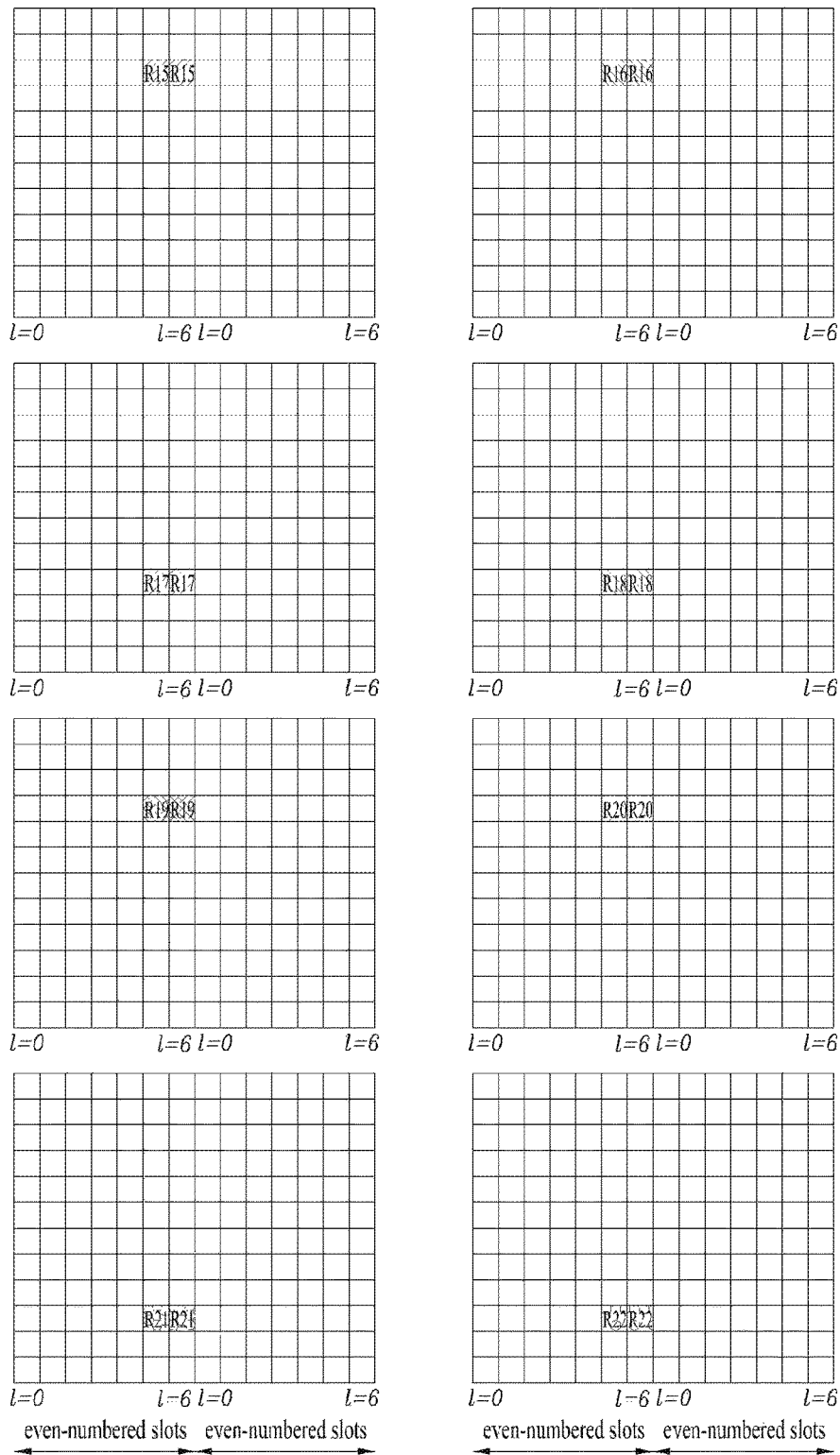
FIG. 11 is a diagram for an example of a CSI-RS configuration #0 in case of a normal CP among downlink CSI-RS configurations defined by a current 3GPP standard document.

In [Table 1] and [Table 2], (k',l') represents an RE index where k' is a subcarrier index and l'is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Information about a Zero Power (ZP) CSI-RS is transmitted in a CSI-RS-Config-r10 message configured by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 3]. zeroTxPowerResourceConfigList-r10 indicates a ZP CSI-RS configuration. The elements of this bitmap indicate the respective configurations written in the columns for four CSI-RS antenna ports in [Table 1] or [Table 2]. A normal CSI-RS not the ZP CSI-RS will be referred to as a NZP (Non zero-power) CSI-RS.

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

Hereinafter, the synchronization signals will be described.

The UE performs an initial cell search procedure such as acquisition of time and frequency synchronization with a cell and detection of physical layer cell identity $N^{cell}_{ID}$ of the cell when it desires to newly enter the cell or its power is turned on. To this end, the UE synchronizes with the eNB by receiving synchronization signals, for example, a primary synchronization signal (PSS) and a secondary synchronization signal (SSS) from the eNB, and acquires information such as cell ID, etc.

In more detail, a Zadoff-Chu (ZC) sequence of a length of 63 is defined in a frequency domain in accordance with the following Equation 8 and used as PSS d(n), whereby the PSS may acquire time domain synchronization and/or frequency domain synchronization such as OFDM symbol synchronization and slot synchronization.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Equation 8]}$$

In the above Equation 8, u indicates a ZC root sequence index, and is defined in the current LTE system as illustrated in Table 4 below.

TABLE 4

| $N_{ID}^{(2)}$ | Root index u |
|---|---|
| 0 | 25 |
| 1 | 29 |
| 2 | 34 |

Next, the SSS is used to acquire frame synchronization, cell group ID and/or CP configuration (that is usage information of normal CP or extended CP) of the cell, and is configured by interleaving combination of two binary sequences of a length of 31. That is, SSS sequences are d(0), . . . , d(61), and have a total length of 62. Also, the SSS sequences are defined differently from each other depending on whether the SSS sequences are transmitted in subframe #0 or subframe #5 as expressed by the following Equation 9. However, in the Equation 9, n is an integer between 0 and 30.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 9]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In more detail, the synchronization signals are transmitted from the first slot of the subframe #0 and the first slot of the subframe #5 in consideration of a global system for mobile communication (GSM) frame length of 4.6 ms for facilitation of inter-radio access technology (inter-RAT) measurement. Especially, the PSS is transmitted from the last OFDM symbol of the first slot of the subframe #0 and from the last OFDM symbol of the first slot of the subframe #5, and the SSS is transmitted from the second to last OFDM symbol of the first slot of the subframe #0 and from the second to last OFDM symbol of the first slot of the subframe #5. A boundary of a corresponding radio frame may be detected through the SSS. The PSS is transmitted from the last OFDM symbol of a corresponding slot and the SSS is transmitted from an OFDM symbol immediately before the OFDM symbol from which the PSS is transmitted.

An SS may represent a total of 504 unique physical layer cell IDs through a combination of 3 PSSs and 168 SSSs. In other words, the physical layer cell IDs are grouped into 168 physical layer cell ID groups, each of which includes three unique IDs so that each physical layer cell ID is a part of only one physical layer cell ID group. Accordingly, a physical layer cell ID NcellID is uniquely defined by number N(1)ID in the range of 0 to 167 indicating a physical layer cell ID group and number N(2)ID from 0 to 2 indicating the physical layer ID in the physical layer cell ID group. The UE may be aware of one of three unique physical layer IDs by detecting the PSS, and may be aware of one of 168 physical layer cell IDs associated with the physical layer ID by detecting the SSS.

Since the PSS is transmitted every 5 ms, the UE may identify that the corresponding subframe is either the subframe #0 or the subframe #5 by detecting the PSS. However, the UE may not exactly identify which one of the subframe #0 and the subframe #5 is the corresponding subframe. Therefore, the UE does not recognize a boundary of the radio frame by using the PSS only. That is, frame synchronization cannot be acquired by the PSS only. The UE detects the boundary of the radio frame by detecting the SSS transmitted twice within one radio frame but transmitted as sequences different from each other.

In this way, for cell search/re-search, the UE may synchronize with the eNB by receiving the PSS and the SSS from the eNB and acquire information such as cell ID. Afterwards, the UE may receive intra-cell broadcast information managed by the eNB on a PBCH.

Meanwhile, in an environment that small cells are arranged densely, the UE may be connected to be overlapped with a macro cell and the small cells, and may perform data offloading. Under the circumstances, it is preferable that the UE distributively receives data and another information together with the macro cell by discovering one or more cells within a communication range. That is, an optimized cell for data offloading is not the optimized cell in view of RSRP (Reference Signal Received Power)/RSRQ (Reference Signal Received Quality). Preferably, a cell which has low load or is connected with many users may be an optimized cell for data offloading in view of entire cell management. The present invention suggests a procedure of transmitting a discovery reference signal (DRS) to detect more cells than a conventional cell detection method.

The DRS suggested in the present invention should (1) detect more cells than the legacy PSS/SSS/CRS based cell detection scheme, (2) detect and measure cells in a short time such as a subframe unit, and (3) support necessary measurement for fast time scale on/off operation. To this end, the present invention considers a structure of the DRS as candidates as follows:

[1] PSS/(SSS)+CRS;
[2] PSS/(SSS)+CSI-RS;
[3] PSS/(SSS)+PRS; and
[4] combination of one or more options of [1]-[3]

Additionally, it is expected that the DRS should be used for coarse time/frequency tracking, measurement of quasi co-location (QCL), etc., and should meet the following requirements.

1) The DRS should support coarse time synchronization with assumption of a very high initial timing error (error of about 2.5 ms).

2) The DRS should support coarse frequency synchronization with assumption of a very high initial frequency error (error of about 20 Khz)

3) The DRS should support the detectability of at least three cells or transmission points.

4) Finally, the DRS should support sufficient accuracy of measurement.

Hereinafter, to support the requirements of (1) and (2), it is assumed that PSS and/or SSS can be transmitted as the DRS.

Also, the periodicity of the DRS should be considered with the following constraints:

(a) multiple of measurement gap period: 40 msec, 80 msec, or 160 msec or 320 msec (if a new measurement gap period is defined, multiple of those new periods can be considered);

(b) alignment with DRX cycle: 10, 20, 32, 40, 64, 80, 128, 160, 256, 320, 512, 640, 1024, 1280, 2048, 2560 [subframe unit] (this constraint may not be considered if a UE uses legacy signals for the serving cell); and (c) if PSS/SSS are transmitted as the DRS, the periodicity of the DRS may be multiple of 5 msec so that PSS/SSS transmitted as the DRS can be replaced by PSS/SSS transmitted in on-state, that is, legacy PSS/SSS. If the PSS/SSS transmitted in on-state does not exist, this constraint may not be considered. Or to avoid impact on the legacy UE, PSS/SSS transmitted in on-state and PSS/SSS transmitted as the DRS may be transmitted with different periodicities not aligned with each other. That is, additional PSS/SSS can be transmitted as the DRS. If additional PSS/SSS are transmitted as the DRS, the additional PSS/SSS can be identified from the legacy PSS/SSS by cell ID.

Hereinafter, the present invention will be described based on PSS/(SSS)+CSI-RS of the DRS candidates of the above [1] to [4]. However, this is intended for convenience of description, and the present invention may similarly be extended to the other DRS candidates.

Figure 12:
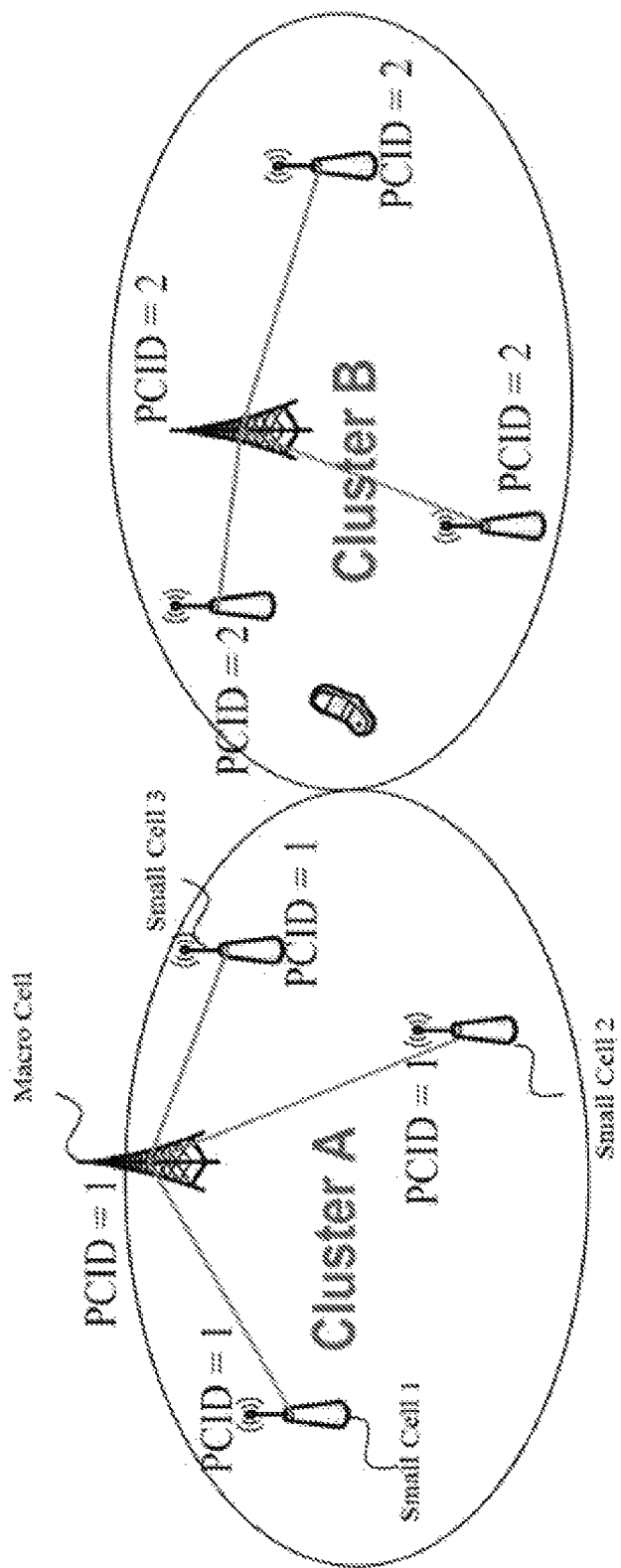
FIG. 12 is a diagram for wireless communication environment according to one embodiment of the present invention.

FIG. 12 is a diagram for wireless communication environment based on a shared cell ID scenario according to one embodiment of the present invention.

A shared cell ID scenario corresponds to environment in which a cell (e.g., a small-cell) cluster or a plurality of TPs (transmission points) belonging to a cell group operate based on an identical physical cell ID (PCID). In this case, a TP may correspond to a small cell or a macro cell, by which the present invention may be non-limited.

Meanwhile, it is not mandatory that each of a plurality of TPs configures a cell. A plurality of the TPs may configure a single physical cell or a virtual cell. For example, a TP may correspond to each of a plurality of antenna elements used in massive MIMO or an array of the antenna elements. For example, assume that a two-dimensional antenna array includes M*N number of physical antenna elements. If a TP corresponds to a single physical antenna element, the two-dimensional antenna array includes M*N number of TPs.

According to a different embodiment, a TP may correspond to a one-dimensional antenna array. If a TP corresponds to a one-dimensional antenna array of a horizontal direction including N number of antenna elements, M numbers of TPs exist in the aforementioned two-dimensional antenna array. Or, if a TP corresponds to a one-dimensional antenna array of a vertical direction including M number of antenna elements, N numbers of TPs exist in the aforementioned 2-dimensional antenna array.

In massive MIMO environment, 3D beamforming can be performed. In this case, the 3D beamforming includes horizontal direction (or azimuth direction) beamforming and vertical direction (or altitude direction) beamforming. The horizontal direction beamforming can be performed mainly using a digital scheme via a precoding or a weighted matrix in a legacy communication system or can be performed using an analog scheme via an analog phase shifter or an amplifier. Meanwhile, it is necessary to perform a beam training to perform the beamforming. The beam training is a procedure for forming a beam optimized to a terminal. For example, if a beam is formed based on closed-loop or open-loop, the beam can be optimized to a terminal by a CSI report of the terminal.

When 3D beamforming is performed, it is necessary to optimize a beam of vertical direction to a terminal as well. In this case, each of TPs can be used for forming a beam of vertical direction different from each other. For example, if each TP corresponds to an antenna array of horizontal direction forming a beam of vertical direction, a first TP can form a first vertical beam and a second TP can form a second vertical beam. An altitude angle formed by the first vertical beam and an altitude angle formed by the second vertical beam may be different from each other. Whether the first vertical beam is appropriate for a terminal or the second vertical beam is appropriate for the terminal can be determined through RS measurement and report (e.g., RRM measurement or CSI measurement) of the terminal.

According to one embodiment of the present invention, since a physical cell ID of the first TP and a physical cell ID of the second TP are identical to each other, it is able to measure both the first vertical beam and the second vertical beam via a single CSI process. It is not necessary for a base station to reconfigure a CSI process to a terminal. The base station can change a TP seamlessly transmitting an RS and becoming a target of measurement from the first TP to the second TP. A first RS configuration for receiving an RS from the first TP and a second RS configuration for receiving an RS from the second TP may be identical to each other or a part of parameters may change. According to one embodiment of the present invention, although a part of parameters of an RS configuration is changed, it is able to provide the second RS configuration to a terminal without RRC reconfiguration.

Meanwhile, one or two or more TPs can configure an amorphous cell. In network environment of the amorphous cell, a UE-centric amorphous cell is dynamically configured instead of a fixed form or coverage of a cell. In this case, the amorphous cell is adaptively updated or reconfigured according to a change of wireless channel environment (movement of a terminal, a change in the number of terminals, a change in wireless channel quality, a change in traffic, etc.). Hence, in order to configure and update the amorphous cell, it is necessary to distribute a plurality of TPs near a user. According to one embodiment of the amorphous cell, a UE-centric cell is configured by a TP1, a TP2 and a TP3 at first timing and a UE-centric cell can be configured by a TP2, a TP3, a TP4 and a TP5 at second timing.

In the amorphous cell network environment, a plurality of TPs can also share a single cell ID with each other. A change of TPs constructing the amorphous cell may not accompany a change of a cell ID. For example, if a first CSI process is set to a terminal to make the terminal report CSI on an amorphous cell of a cell ID 1, although TPs constructing the amorphous cell are changed, the terminal continuously performs the first CSI process corresponding to the cell ID 1. In order to continuously perform the first CSI process, reconfiguration of an RRC connection may not be requested to the terminal.

Yet, a TP, which becomes a target of CSI measurement, corresponding to a main entity for transmitting an RS can be changed. For example, when a TP 1 transmits a CSI-RS (or a CRS) at first timing and a TP 5 transmits a CSI-RS (or a CRS) at second timing, it is necessary to provide an RS configuration of the second timing to a terminal to enable a CSI-process and CSI measurement to be seamlessly performed. According to a legacy standard, an RS configuration is provided via RRC reconfiguration. Yet, in environment in which a change of a TP does not accompany RRC reconfiguration, if RRC reconfiguration is performed to provide an RS configuration, it is inefficient and configuration of a dynamic amorphous cell can be impeded by the RRC reconfiguration. Hence, according to one embodiment of the present invention, an RS configuration for a TP 5 can be provided to a terminal without RRC reconfiguration.

In the following, methods of signaling an RS configuration to a terminal are explained in more detail. Embodiments described in the following can be applied to the aforementioned network environments.

Referring to FIG. 12, 4 TPs including 1 macro cell and 3 small cells exist in a cluster A. The TPs belonging to the cluster A share a single PCID (i.e., 1) with each other. Meanwhile, TPs belonging to a cluster B share a single PCID (i.e., 2) with each other. In this case, it is not mandatory that a name of a PCID shared in a cluster is restricted to a physical cell ID. The name of the PCID can be indicated using a cluster ID or a group ID as well.

A PCID may correspond to a cell-specific ID used for generating and/or mapping a PSS/SSS and a CRS sequence in LTE technology. For example, TPs belonging to a cluster can share a cell-specific ID of a TP (e.g., a macro cell). According to a different embodiment, the PCID may correspond to an ID newly defined for the usage of sharing in a cluster.

For an additional cell-splitting gain among a plurality of TPs in a cluster, unique identification information can be provided to each of a plurality of the TPs. The unique identification information is referred to as a TPID. The TPID may correspond to a unique ID of each of a plurality of the TPS belonging to the cluster.

According to one embodiment, the TPID can be used as a sequence scrambling initialization parameter of a CSI-RS transmitted from a TP. Besides the CSI-RS, the TPID can also be used for generating and transmitting other TP-specific RSs.

In embodiments described in the following, it may be able to consider a situation that each TP transmits a unique TP-specific discovery reference signal (DRS). Since the DRS corresponds to a TP-specific reference signal used for measuring discovery of a cell, an RSRP of a cell, and the like, the DRS is different from a UE-specific RS for demodulating data (e.g., a DMRS (demodulation RS or a dedicated RS) or a UE-specific RS)).

In the following description, assume that a CSI-RS is used as a DRS transmitted by each TP, by which the present invention may be non-limited. It may be able to define and use a different TP-specific DRS. For example, as mentioned in the foregoing description, a PSS, an SSS, and/or a CRS can be used as a DRS. In other word, as mentioned in the foregoing description, the DRS can be configured by one or two or more combinations of the PSS, the SSS, the CRS and the CSI-RS. For clarity, assume that a TP ID is used as a scrambling ID of the DRS. If the TP ID and the scrambling ID of the DRS are different from each other, the TP ID and the scrambling ID can be associated with each other via higher layer signaling for a relationship between the TP ID and the scrambling ID.

Meanwhile, a legacy CSI-RS was used for the purpose of measuring CSI and performing CSI feedback in a manner that a terminal receives the CSI-RS. In particular, the terminal measures the CSI to acquire CSI feedback information including at least one of PMI, RI and CQI. Since the CSI feedback information is used for estimating a channel between a serving base station and a UE, the CSI feedback information is different from radio resource management (RRM) measurement for UE mobility. In order to perform the RRM measurement for UE mobility, CRS-based RSRP (reference signal received power), RSRQ (reference signal received quality), and RSSI (received signal strength indicator) measurement are used. Hence, in case of measuring the legacy CSI-RS, a UE measures at least one of CQI, RI and PMI rather than the RSRP or the RSRQ. According to one embodiment of the present invention, a CSI-RS can be used as a DRS. In this case, a terminal may measure RSRP, RSRQ, and/or RSSI of the CSI-RS.

In order to clearly distinguish the legacy CSI-RS for measuring CSI and making a feedback on the CSI from the newly defined CSI-RS used as a DRS, the CSI-RS used for CSI feedback is referred to as a FB-CSI-RS (feedback-CSI-RS) and the CSI-RS used as a DRS is referred to as a DRS-CSI-RS. For example, the CSI-RS mentioned earlier in the paragraphs related to FIG. 10, FIG. 11, Table 1, Table 2, and Table 3 is referred to as the FB-CSI-RS in the following.

In general, small cells are distributed in a macro cell (macro cell coverage) and may operate on a frequency (e.g., a component carrier (CC)) different from the macro cell (e.g., this is referred to as a small cell scenario 2). For example, a frequency of a Pcell of a macro cell to which a UE has accessed may correspond to a first CC and a frequency of neighboring small cells to be detected by the UE may correspond to a second CC. The UE can access a small cell via a series of procedures including a procedure of detecting a DRS (discovery signal) intermittently transmitted by the small cells and a procedure of performing an RRM report. Meanwhile, if the small cells are set to the UE as an Scell, the UE can perform a CA (carrier aggregation) operation based on the Pcell of the macro cell and the Scell of the small cell. Yet, according to a different embodiment of the present invention, if the UE supports dual connectivity, both the small cell and the macro cell can be configured as the Pcell or a plurality of small cells can be configured as the Pcell. In the following, for clarity, the present invention is explained under an assumption that the small cells are configured as the Scell. Yet, the scope of the present invention is not restricted to the assumption.

Since a plurality of small cells share an identical PCID (physical cell ID), a UE recognizing a cell based on the PCID may recognize a plurality of the small cells as a physical cell or a virtual cell of big coverage. In a system that a plurality of the small cells share the PCID, frequency and overhead of handover performed by a UE can be reduced and interference caused by a CRS transmitted based on the PCID can be reduced as well. Hence, in order for a plurality of the small cells to serve the UE while sharing the PCID, an ideal backhaul and tight scheduling coordination are required among the small cells.

Meanwhile, although a plurality of small cells form virtual cell coverage, there may exist a single small cell only transmitting data to a UE. It is able to assume that not all small cells transmit data to the UE. If a plurality of geographically distributed small cells transmit data to a single UE, it may cause power waste. And, if a single small cell transmits data to a UE only, other small cells forming a virtual cell may acquire a spatial reuse gain.

Control information can be scheduled based on EPDCCH for a UE. According to a different embodiment, when a small cell is configured as an Scell, it may not transmit PDCCH since it is not necessary for a UE to receive a CSS.

In a CoMP (coordinated multi-point) operation, a plurality of TPs can serve a UE in a manner of sharing a virtual cell ID with each other. Yet, in case of the CoMP, since a plurality of the TPs transmit data to the UE (e.g., in case of joint processing), there may exist a burden for the UE to perform a plurality of CSI processes in response to each of a plurality of the TPs.

According to embodiments of the present invention, a UE can receive data in a manner of semi-statically switching a plurality of TPs without a CoMP operation. The UE processes a single CSI process only. A TP optimized to the UE is changed according to a change of a radio channel. The UE can receive a service from the optimized TP without a handover by semi-statically switching a TP. For example, in case of switching a TP only without reconfiguring an RRC connection, it may be able to reduce delay caused by handover and reconfiguration of the RRC connection.

I. Scell Addition & Activation

In order for a UE to add small cells distributed in cell coverage of a macro cell to an Scell, it is necessary for the UE to receive an Scell addition message for CA from a macro cell base station via RRC signaling. And, the UE can receive a service through the Scell after an Scell activation message added via MAC control element signal is received.

Figure 13:
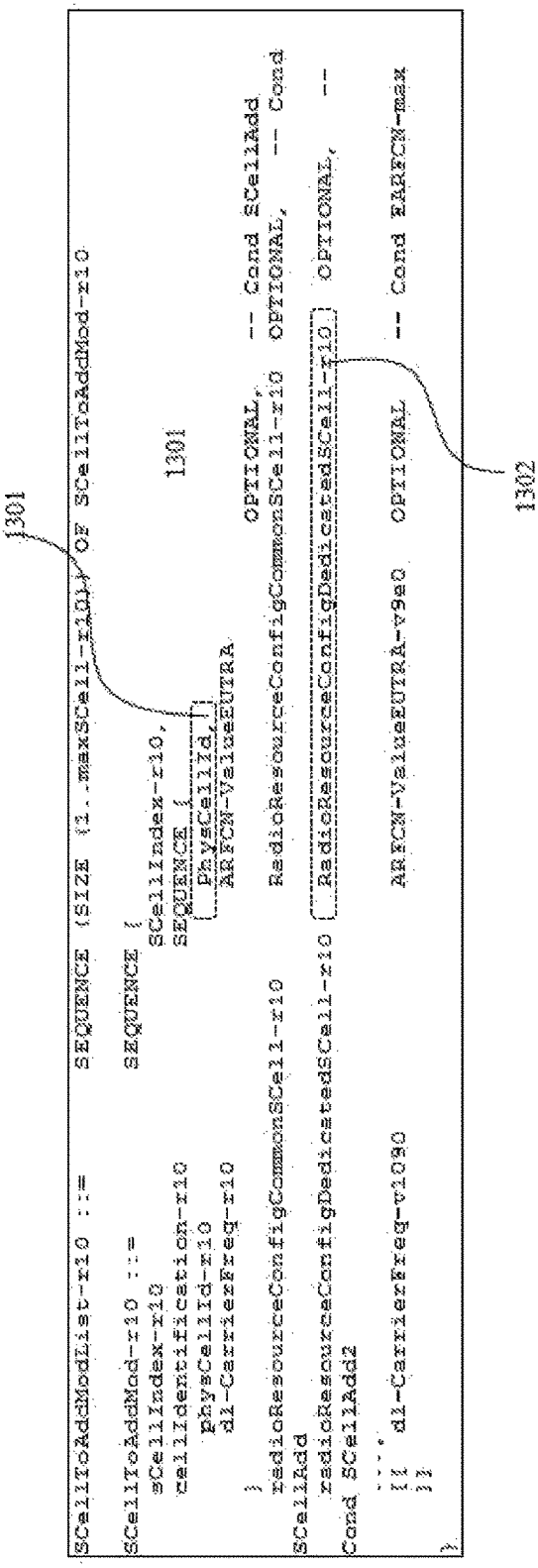
FIG. 13 is a diagram for an example of an additional configuration information element of an Scell.

FIG. 13 is a diagram for an Scell addition IE (information element) of 3GPP TS 36.331. For example, if a UE receives RRC signal shown in FIG. 13, an Scell can be added. As shown in FIG. 13, the Scell addition IE includes a PCID 1301. If a cell ID is shared between TPs, it is not necessary to perform Scell addition again to change a TP. In particular, RRC connection reconfiguration is not necessary. This is because, although a TP is changed, the PCIS 1301 is identically maintained.

FIG. 14 is a diagram for an example of a UE-dedicated Scell RRC configuration IE 1302 transmitted via RRC signaling of 3GPP TS 36.331. Referring to FIG. 14, the UE-dedicated Scell RRC configuration IE 1302 includes a UE-dedicated Scell physical layer configuration IE 1302_1.

FIG. 15 is a diagram for an example of a Scell physical layer configuration IE 1302_1 of 3GPP TS 36.331. In FIG. 15, CSI-RS-Config-r10 1302_1_1 corresponds to an NZP-CSI-RS (non-zero power-CSI-RS) configuration in a transmission mode 9 (TM9) or less (i.e., non-CoMP modes). CQI-ReportConfigSCell-r10 1302_1_2 corresponds to a CSI report configuration in the transmission mode 9 or less. CSI-RS-ConfigNZP-r11 1302_1_3 corresponds to one or a plurality of NZP-CSI-RS configurations in a transmission mode 10 supportive of CoMP. CQI-ReportConfig-v1130 1302_1_4 corresponds to a CSI report configuration in the transmission mode 10.

FIG. 16 is a diagram for an example of a CQI report configuration 1302_1_3 in a transmission mode 10 according to 3GPP TS 36.331. Referring to FIG. 16, the CQI report configuration 1302_1_3 includes CQI-ReportBoth-r11 IE 1302_1_3_1. In the transmission mode 10 (TM 10), a Scell addition IE including a CSI process 1032_1_3_1_1 is provided to a UE via RRC signaling. Hence, after the Scell addition IE is set to the UE via RRC, a base station can activate a Scell configured via MAC CE signaling. In particular, when a Scell is initially set to the UE via RRC, since the Scell is set to the UE in a deactivation state, the base station activates the Scell via the MAC CE.

If the Scell is activated, CSI reporting on the Scell is activated. Meanwhile, referring to 5. 13 Activation/Deactivation of SCells of 3GPP TS 36.321, contents on the Scell activation/deactivation via the MAC CE signaling are described.

II. FB-CSI-RS & DRS-CSI-RS Configurations

NZP CSI-RS configuration which is provided when the Scell is added, for example, CSI-RS-Config-r10 1302_1_ in the TM 9 or less or CSI-RS-ConfigNZP-r11 1302_1_4 in the TM 10 may be referred to as a FB-CSI-RS configuration.

II-1. Independent Configurations

If a DRS-CSI-RS-related configuration is newly defined based on a current standard, a DRS-CSI-RS configuration and a FB-CSI-RS configuration can be separately provided to a single TP. The FB-CSI-RS configuration can include a transmission period (e.g., 5 ms), a subframe offset, number of antenna ports, a frequency/time resource, and a virtual cell ID (VCID). The FB-CSI-RS configuration can include QCLed CRS information as well. QCL available property is limited to Doppler shift and Doppler spread. FIG. 17 is a diagram for an example of a FB-CSI-RS configuration according to 3GPP TS 36.331.

A DRS-CSI-RS configuration can be set to a UE irrespective of a FB-CSI-RS configuration. For example, a period of DRS-CSI-RS (e.g., 160 ms), a subframe offset, number of antenna ports, a frequency/time resource, a virtual cell ID (VCID or TPID), QCLed signal information and the like can be set to a UE irrespective of the FB-CSI-RS configuration. For example, the DRS-CSI-RS can be QCL with at least one signal selected from the group consisting of PSS, SSS, CRS and FB-CSI-RS.

II-2. Associated Configurations

According to a different embodiment of the present invention, FB-CSI-RS configuration can be acquired from DRS-CSI-RS configuration rather than the DRS-CSI-RS configuration and the FB-CSI-RS configuration separately provided. Hence, a base station does not separately provide FB-CSI-RS configuration information to a UE. Instead, the base station can signal the DRS-CSI-RS configuration to be applied to the FB-CSI-RS configuration in a manner of being adaptively changed. The UE can obtain the DRS-CSI-RS configuration when a Scell is added or via RRC signaling of the DRS-CSI-RS configuration or a discovery procedure, which is performed irrespective of the addition of the Scell. Although a specific TP is activated among TPs discovered using the DRS-CSI-RS configuration, FB-CSI-RS configuration for the activated specific TP is not separately provided to the UE. Instead, the UE can induce the FB-CSI-RS configuration from the DRS-CSI-RS configuration previously set to the activated specific TP.

According to the present embodiment, it is able to assume that transmission of a FB-CSI-RS and transmission of a DRS-CSI-RS are associated with each other in each TP. As an example of the assumption on the association, it is able to assume that the DRS-CSI-RS is configured as a subset of the FB-CSI-RS or a sequence mapping pattern of the DRS-CSI-RS and a sequence mapping pattern of the FB-CSI-RS are overlapped with each other in some part. As a more concrete example, the FB-CSI-RS is transmitted in a second and a third OFDM symbol of a second slot once in 5 ms via $11^{th}$ and $12^{th}$ subcarriers. On the contrary, the DRS-CSI-RS can be transmitted in the second and third OFDM symbols of the second slot once in 40 ms via the $11^{th}$ subcarrier. Hence, a transmission period of the DRS-CSI-RS may correspond to x multiple (where x>=1) of a transmission period of the FB-CSI-RS.

If a resource to which the FB-CSI-RS is mapped and a resource to which the DRS-CSI-RS is mapped are different from each other, a base station can also configure FB-CSI-RS configuration to be used in the future via higher layer when the DRS-CSI-RS is set to a UE. FB-CSI-RS resource/pattern configurations to be used in each TP are implicitly or explicitly set to the UE in advance. If a corresponding TP is activated, the UE receives and measures the FB-CSI-RS using the implicitly or explicitly configured FB-CSI-RS configuration.

According to the aforementioned DRS-CSI-RS/FB-CSI-RS configuration schemes, a semi-static point switching (SSPS) operation can be performed without reconfiguration of an RRC connection. A FB-CSI-RS configuration for the SSPS operation corresponds to an adaptive change of a DRS-CSI-RS configuration used to be transmitted by a corresponding TP or can be acquired from a DRS-CSI-RS configuration, which is reconfigured or indicated to perform a role of a FB-CSI-RS as well.

II-2-(1). TP Coordination and Collaboration

Since TPs supportive of the SSPS perform coordination and collaboration among the TPs, if an activation TP of a UE is changed, an activation TP of a new UE receives not only a CSI-RS resource (e.g., ZP CSI-RS resource) but also a not reconfigured parameter from a previously activated TP or receives RRC configuration of the UE as it is. TPs performing collaboration can share RRC configuration for a single UE with each other. For example, a parameter of RRC configuration shared among TPs can include at least one of (i) EPDCCH set configuration, (ii) CSI configuration, and (iii) DMRS scrambling ID or transmission mode.

(i) EPDCCH set configuration—PRB (physical resource block) set, monitoring subframe set: EPDCCH set configuration set to a UE is shared between TPs. Since a ZP (zero power)-CSI-RS resource, which is rate matched in an EPDCCH PRB, is changed together according to a change of a FB-CSI-RS resource, rate matching may vary according to a TP. As a more concrete example, according to 3GPP Rel-11 standard, maximum 2 EPDCCH sets can be set to a UE. Information indicating a FB-CSI-RS, which is QCL according to each EPDCCH set, can be included in RRC configuration of the EPDCCH sets. In particular, a PQI (PDSCH RE mapping and Quasi-co-location Indicator) index is indicated according to each EPDCCH set. A FB-CSI-RS of which QCL assumption is available with a DMRS of EPDCCH is fixedly set to each EPDCCH set via the PQI index. According to one embodiment of the present invention, instead of fixedly RRC signaling the FB-CSI-RS, which is QCL with the DMRS of the EPDCCH set via the configuration of the EPDCCH set, it is assumed that a FB-CSI-RS, which is implicitly or explicitly interlocked with a DRS-CSI-RS of a detected TP, is QCL with the DMRS of the EPDCCH. Hence, the EPDCCH set configuration is maintained as it is except a configuration for QCL. Yet, a CSI-RS (e.g., ZP-CSI-RS) capable of applying QCL assumption with a DMRS of EPDCCH can be changed to a FB-CSI-RS (e.g., ZP-CSI-RS interlocked with a FB-CSI-RS) interlocked with a DRS-CSI-RS only.

(ii) CSI configuration parameters—For example, configuration for ON/OFF of PMI/RI, a measurement subframe set, and the like is inherited between TPs as it is. If a FB-CSI-RS is changed, although CSI measurement is reset, a report configuration (e.g., a period, etc.) of the CSI measurement is maintained as it is. As a concrete embodiment, while a periodic CSI report configuration via RRC signaling is not changed (e.g., one CSI report configuration is RRC signaled only in response to a specific CC), a FB-CSI-RS, which is a target signal measured according to the CSI report configuration (e.g., transmitted by a PUCCH format 2, resource location information, period/offset information, etc.), can be changed. For example, the FB-CSI-RS is changed to a FB-CSI-RS implicitly or explicitly interlocked with a DRS-CSI-RS of a detected TP. Meanwhile, ZP-CSI-RS and/or CSI-IM (interference measurement) configuration associated with a FB-CSI-RS can be changed together with the FB-CSI-RS. According to the present embodiment, since the FB-CSI-RS is changed without a change of CSI report configuration, it is different from a legacy scheme in that a FB-CSI-RS is fixedly RRC signaled according to a CSI report configuration.

And, whether or not PMI/RI is ON/OFF in a CSI report can be determined based on information configured in advance in response to a FB-CSI-RS associated with a DRS-CSI-RS. For example, whether or not PMI/RI is ON/OFF can be determined based on PMI/RI ON/OFF indicated by a FB-CSI-RS configuration or a CSI process configuration associated with the FB-CSI-RS configuration.

(iii) DM-RS scrambling ID, transmission mode (TM), etc.—Parameters for transmitting data can be maintained as it is. Yet, as mentioned in the foregoing description, rate matching may change according to a change of a ZP-CSI-RS.

II-2-(2). SSPS Operation

Meanwhile, although a TP is changed, a UE can perform time/frequency tracking using a CRS. A UE belonging to a virtual cell, which is formed by TPs sharing a cell ID with each other, receives data from a single TP among a plurality of TPs. Hence, it is not necessary for the UE to perform a CSI process in response to all TPs. The UE performs the CSI process for the TP transmitting data to the UE. Yet, if the UE supports multiple CSI processes and CoMP transmission (e.g., TM 10), a plurality of activated TPs may transmit data to the UE. In this case, a PQI entry configuration can be performed according to each of a plurality of the activated TPs.

If a TP is changed, a ZP-CSI-RS or IMR (interference measurement resource) configuration may change. When a DRS-CSI-RS for a specific TP is set to a UE, a ZP-CSI-RS and/or IMR, which is to be used when the specific TP is activated, can be set to the UE as well. Or, if the specific TP is activated, it is able to define and configure a ZP-CSI-RS configuration associated with a FB-CSI-RS or a DRS-CSI-RS to be activated together. For example, when a plurality of ZP-CSI-RSs are set via RRC, an interworking relationship between a ZP CSI-RS configuration and a DRS-CSI-RS configuration can also be set via RRC. Since it is able to consider a DRS-CSI-RS as a representative RS of a TP, ZP CSI-RS configuration information capable of performing PDSCH RE mapping can be provided to a UE according to each TP via RRC configuration. If a TP is changed by an SSPS operation, the UE applies configuration of a ZP-CSI-RS to the changed TP.

According to embodiments of the present invention, if a best TP of a UE is determined by detecting a DRS-CSI-RS and reporting RRM (e.g., RSRP, RSRQ) on the DRS-CSI-RS, the DRS-CSI-RS used to be transmitted by the determined TP is changed to a FB-CSI-RS or the DRS-CSI-RS can perform a role of the FB-CSI-RS as well. Since power of TPs is turned ON/OFF depending on such a state as network load and the like and the TPs can be very densely distributed to a specific area, it is difficult to determine best TPs of the UE in advance. Hence, it is difficult to signal a FB-CSI-RS configuration to a best TP of the UE in advance via RRC. For example, it is difficult to signal CSI-RS-Config-r10 (1302_1_1, UE of TM 9 or less) or CSI-RS-ConfigNZP-r11 (1302_1_4, UE of TM 10) to the best TP of the UE in advance via RRC.

Meanwhile, according to a current 3GPP Rel-11 standard, maximum 3 CSI-RS-ConfigNZP-r11 (1302_1_4) can be set to a UE via RRC. It is not preferable to simply increase (e.g., 10) the number of CSI-RS-ConfigNZP-r11 (1302_1_4) capable of being set to the UE. This is because, if FB-CSI-RS configuration is signaled to all potential TPs capable of being best cell to the UE via RRC, it may increase system overhead. Moreover, if the UE receives SCell activation message via MAC, the UE makes a feedback on all configured NZP-CSI-RSs. It may lead to the increase of uplink overhead and processing complexity of the UE.

In the following, concrete items for an SSPS operation are explained.

II-2-(2)-(i). Indication of Activated/Deactivated TP

It is able to indicate an activated/deactivated TP via a SCell activation/deactivation message through MAC CE or via a separate SCell TP change message. For example, when a physical cell ID (SCell) is shared by 10 TPs, it is able to indicate activated/deactivated TPs via a 10-bit bitmap. An index of each TP and an index of a DRS-CSI-RS can be identically configured. When a DRS-CSI-RS is set to a UE, the index of the DRS-CSI-RS can be assigned according to a DRS-CSI-RS. When a UE performs blind decoding on a resource of a DRS-CSI-RS, a CSI-RS resource index can be used as a TP index. For example, it is able to define as a CSI-RS resource configuration N is mapped to a TP index=N. The UE can determine whether the TP index=N is activated or deactivated according to whether or not a DRS-CSI-RS is detected on the CSI-RS resource configuration N. If an additional configuration on a FB-CSI-RS is not provided to the UE, the UE is able to assume that the FB-CSI-RS is transmitted in a resource identical to a DRS-CSI-RS and it is able to assume that a period of the FB-CSI-RS is fixed by T msec (e.g., T=5 msec). It is able to induce a subframe offset (OFFSET_FB) of the FB-CSI-RS from a subframe offset (OFFSET_DRS) of the DRS-CSI-RS configuration. For example, the OFFSET_FB can be determined based on OFFSET_DRS modular T. In other word, if t corresponds to 5, a TP transmits the FB-CSI-RS with a period of 5 ms in on state. In off state, the TP transmits the identical FB-CSI-RS as a DRS-CSI-RS while a period is changed to a transmission period of the DRS-CSI-RS.

II-2-(2)-(ii). Indicating Change of DRS-CSI-RS Configuration

Meanwhile, if a SCell is activated, as shown in Table 5, at least one of parameters of DRS-CSI-RS configuration can be changed or added. A TP can inform a UE of the change or addition via signaling of a MAC layer or dynamic signaling (e.g., DCI) of a physical layer. For example, before the SCell is activated, assume that the parameters of the DRS-CSI-RS configuration include a transmission period T (ms), an offset D (ms), resource location information R, a DRS scrambling initialization parameter (sequence scrambling initialization parameter (SSIP)) V, number of antenna ports P, and QCL assumption information Q. If a UE receives a message for changing or adding a DRS-CSI-RS configuration parameter and CSI-RS-Config-r10 (1302_1_1) or CSI-RS-ConfigNZP-r11 (1302_1_4) for the activated SCell is set to the UE in advance, the UE ignores the CSI-RS-Config-r10 (1302_1_1) or the CSI-RS-ConfigNZP-r11 (1302_1_4) set to the UE in advance. Or, the UE is able to recognize that the message for changing or adding the DRS-CSI-RS configuration parameter overrides the CSI-RS-Config-r10 (1302_1_1) or the CSI-RS-ConfigNZP-r11 (1302_1_4) set to the UE in advance. The UE acquires configuration of a FB-CSI-RS transmitted by the activated TP using the message for changing or adding the DRS-CSI-RS configuration parameter and performs FB-CSI-RS report. According to a different embodiment, it is able to clearly describe as such FB-CSI-RS configuration information as the CSI-RS-Config-r10 (1302_1_1) or the CSI-RS-ConfigNZP-r11 (1302_1_4) is not provided. According to a further different embodiment, if the CSI-RS-Config-r10 (1302_1_1) or the CSI-RS-ConfigNZP-r11 (1302_1_4) is provided together with the message for changing or adding the DRS-CSI-RS configuration parameter, the UE considers it as an error case and may be then able to ignore all configuration information and messages.

II-2-(3)-(iii). Indicating Associated FB-Configuration-Index

As a further different embodiment, a TP can inform a UE of an index with which a DRS-CSI-RS used to be transmitted by the TP is associated among FB-configuration-index(es) configured in advance via a SCell activation/deactivation message (e.g., MAC CE) or a separate message. Although the FB-configuration-index is allocated according to a FB-CSI-RS configuration, the FB-configuration-index can be associated with at least one or more parameters of the DRS-CSI-RS configuration. For example, the FB-configuration-index can be associated with at least one of a transmission period T (ms) of the DRS-CSI-RS configuration, an offset D (ms), resource location information R, a DRS scrambling initialization parameter (sequence scrambling initialization parameter (SSIP)) V, number of antenna ports P, and QCL assumption information Q.

Table 5 shows examples of FB-CSI-RS configuration according to one embodiment of the present invention.

TABLE 5

A. FB-CSI-RS transmission period T' (e.g., 5 ms)
B. FB-CSI-RS transmission offset D' (ms)
C. FB-CSI-RS transmission port number (e.g., 4)
D. FB-CSI-RS transmission (resource) RE location information R'
E. FB-CSI-RS SSIP V' (e.g., 132)
F. QCL assumption information Q' on different RS of FB-CSI-RS Embodiments for inducing parameters of FB-CSI-RS configuration from DRS-CSI-RS configuration are explained in more detail in the following. When the parameters of the FB-CSI-RS configuration are induced, it may use a prescribed message. The prescribed message may correspond to the aforementioned Scell activation message or a message provided irrespective of the Scell activation message.

A. The prescribed message can include FB-CSI-RS configuration indicating a transmission period T (e.g., 160 ms) of a DRS-CSI-RS to be changed into T' (e.g., 5 ms) from timing at which the message is received or specific timing indicated by the message. Or, the FB-CSI-RS configuration included in the prescribed message can be replaced with DRS-CSI-RS configuration.

B. The prescribed message can include FB-CSI-RS configuration indicating a transmission offset D of a DRS-CSI-RS to be changed into D' from timing at which the message is received or specific timing indicated by the message. Or, the FB-CSI-RS configuration included in the prescribed message can be replaced with DRS-CSI-RS configuration.

C. The prescribed message can include FB-CSI-RS configuration indicating the number of transmission antenna ports P (e.g., 2) of a DRS-CSI-RS to be changed into P' (e.g., 4) from timing at which the message is received or specific timing indicated by the message. Or, the FB-CSI-RS configuration included in the prescribed message can be replaced with DRS-CSI-RS configuration.

D. The prescribed message can include FB-CSI-RS configuration indicating a transmission RE position R of a DRS-CSI-RS to be changed into R' from timing at which the message is received or specific timing indicated by the message. Or, the FB-CSI-RS configuration included in the prescribed message can be replaced with DRS-CSI-RS configuration. Meanwhile, the R and the R' can be indicated by Table 1 or Table 2. The R and the R' may correspond to information of a different form capable of representing an RE(s) position.

E. The prescribed message can include FB-CSI-RS configuration indicating a scrambling initialization parameter V (e.g., 455) of a DRS-CSI-RS to be changed into V' (e.g., 132) from timing at which the message is received or specific timing indicated by the message. Or, the FB-CSI-RS configuration included in the prescribed message can be replaced with DRS-CSI-RS configuration.

F. The prescribed message can include FB-CSI-RS configuration indicating QC assumption information Q of a DRS-CSI-RS to be changed into Q' from timing at which the message is received or specific timing indicated by the message. Or, the FB-CSI-RS configuration included in the prescribed message can be replaced with DRS-CSI-RS configuration. The Q and the Q' can independently indicate a QCL target property (e.g., at least one of delay spread, Doppler spread, Doppler shift, average gain, and average delay) for a QCL target signal (e.g., at least one of a PSS, an SSS and a CRS). For example, in order to perform discovery and RRM report, the Q can indicate that a QCL target signal (e.g., DRS-PSS/DRS-SSS/DRS-CRS) indicated through a cell ID and a DRS are able to perform QCL assumption in response to delay spread, Doppler spread, Doppler shift, average gain and/or average delay. The Q' can indicate that a QCL target signal (e.g., PSS/SSS/CRS) indicated through a cell ID and a FB-CSI-RS are able to perform QCL assumption in response to Doppler spread and Doppler shift only. The Q' can be indicated in a manner of being similar to QCLed CRS included in NZP-CSI-RS configuration in current standard, by which the present invention may be non-limited.

Meanwhile, a TP can set FB-configuration-index 1, 2 and 3 shown in Table 6 to a UE in advance via RRC. For example, a message for activating a TP, which is reported as a TP providing highest RSRP to the UE, as a SCell can be transmitted to the UE. The SCell activation message can include information on a FB-configuration-index with which a DRS-CSI-RS of the TP is interlocked among the FB-configuration-index 1, 2 and 3. The UE applies FB-CSI-RS configuration based on a FB-configuration-index (e.g., 2) interlocked with a DRS of the TP from timing at which the SCell activation message is received or timing indicated by the SCell activation message. Or, the UE may recognize that the DRS-CSI-RS configuration is replaced with the FB-CSI-RS configuration. The UE performs CSI report according to the FB-CSI-RS configuration.

TABLE 6

FB-config-index 1(example):

A. FB-CSI-RS transmission period T' = 5 ms
B. FB-CSI-RS transmission offset D' = 0 ms
C. FB-CSI-RS transmission port number P' = 4

FB-config-index 2(example):

A. FB-CSI-RS transmission period T' = 10 ms
B. FB-CSI-RS transmission offset D' = 0 ms
C. FB-CSI-RS transmission port number P' = 2

FB-config-index 3(example):

A. FB-CSI-RS transmission period T' = 20 ms
B. FB-CSI-RS transmission offset D' = 10 ms
C. FB-CSI-RS transmission port number P' = 4

In Table 6, if the number of antenna ports P of a DRS-CSI-RS and the number of antenna ports P' of a FB-CSI-RS are different from each other, it is able to perform one-to-one mapping between ports of the DRS-CSI-RS and ports of the FB-CSI-RS by sequentially increasing a port number form a lowest port number. For example, when the P corresponds to 2 (e.g., port 15, 16) and the P' corresponds to 4 (e.g., port 15, 16, 17 and 18), it may be able to recognize that port numbers are matched with other in one-to-one relationship between two ports from the lowest number port (e.g., port 15 and 16).

As shown in Table 6, RE information of the FB-CSI-RS may not be included. It may indicate that RE location information R indicating a location at which the DRS-CSI-RS is transmitted and RE location information R' indicating a location at which the FB-CSI-RS is transmitted are identical to each other.

As shown in Table 6, scrambling initialization parameter information of the FB-CSI-RS may not be included. In this case, a UE can consider it as SSIP V of the DRS-CSI-RS and SSIP V' of the FB-CSI-RS are identical to each other.

Table 6 can further include QCL assumption information Q' on the FB-CSI-RS.

As mentioned in the foregoing description, the FB-config-index and interlocking information on the FB-config-index can be set to a UE in advance. If it is determined that a UE 1 is to be added as a SCell, the UE acquires a FB-config-index interlocked with a DRS-CSI-RS of the TP 1 via MAC CE (e.g., SCell activation/deactivation message or a separate message).

When the embodiment of II-2-(3)-(ii) and the embodiment of II-2-(3)-(iii) are compared with each other, according to the embodiment of II-2-(3)-(ii), since a TP explicitly signals time/resource positions capable of transmitting a FB-CSI-RS via MAC CE, it is able to have a merit in that a flexible configuration is available. Yet, since a completely independent configuration is available according to a FB-CSI-RS, an impact affecting a legacy system may be not less. According to the embodiment of II-2-(3)-(iii), since a network determines candidates for time/resource positions capable of transmitting a FB-CSI-RS in advance, it may be able to minimize an impact caused by ZP CSI-RS configuration and the like that affects a legacy system.

According to the aforementioned embodiments, since a SCell is activated/deactivated via MAC CE or DCI, it is able to perform an SSPS operation via a DRS-CSI-RS without configuring multiple CSI processes.

Figure 18:
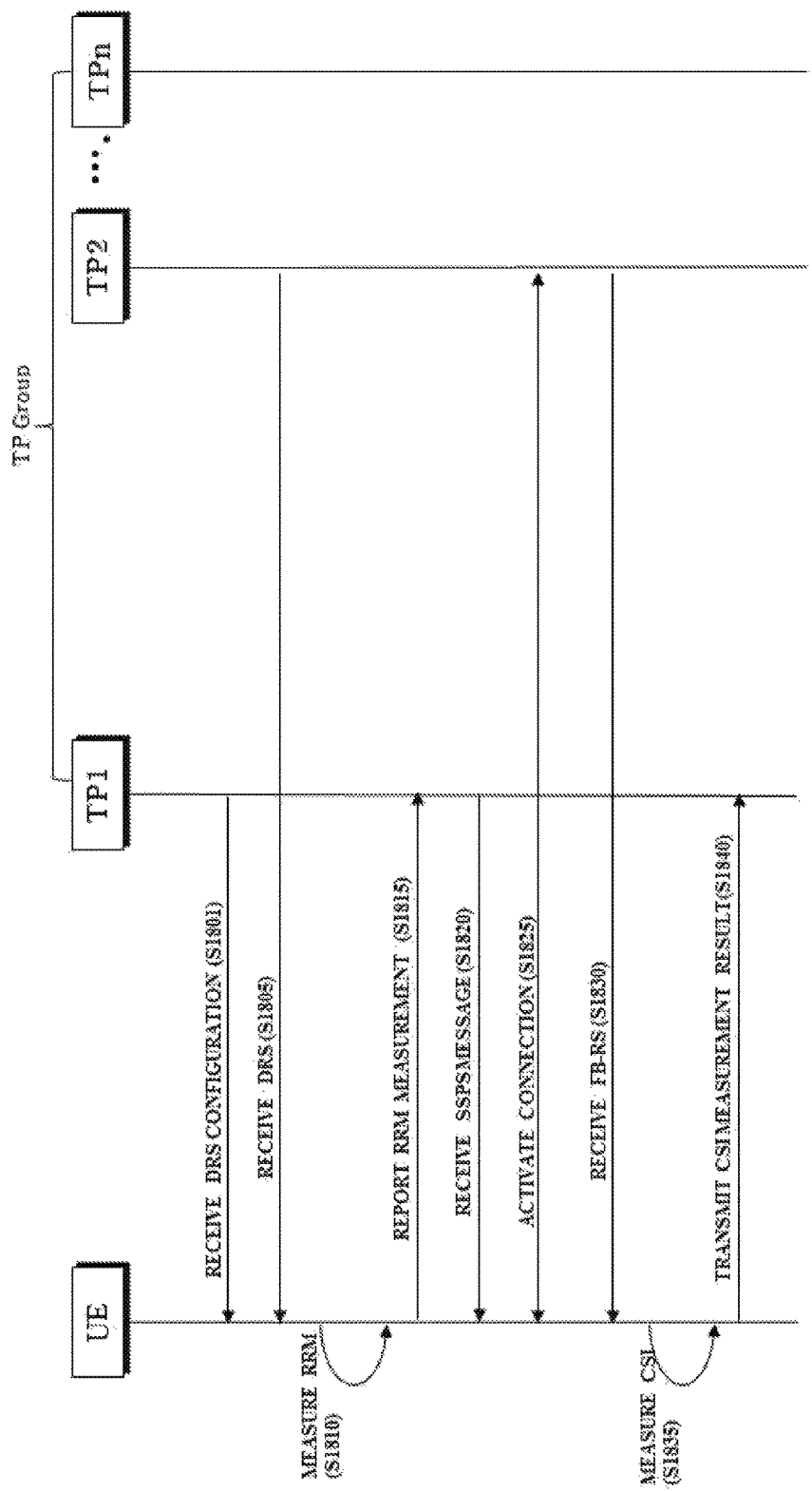
FIG. 18 is a flowchart for a method of transmitting and receiving a reference signal according to one embodiment of the present invention.

FIG. 18 is a flowchart for a method of transmitting and receiving a reference signal according to one embodiment of the present invention. Explanation on contents overlapped with the aforementioned contents is omitted.

Referring to FIG. 18, a TP 1 to a TP n construct a TP group sharing a single physical cell ID. The TP 1 may correspond to a macro cell of a TP 2, which always operates as an activated primary cell (PCell) in response to a UE. Or, the TP 1 may correspond to a small cell operating as a SCell of a terminal, which is deactivated according to the activation of the TP 2. The TP 2 may correspond to a small cell belonging to the TP group. The small cells belonging to the TP group can be activated or deactivated according to a semi-static point switching operation. The TP group can share at least one of EPDCCH (enhanced physical downlink control channel) configuration, channel state information (CSI) report configuration, demodulation reference signal (DMRS) scrambling ID, and transmission mode configuration for a UE.

The UE receives DRS (e.g., DRS-CSI-RS) configuration form the TP 1 [S1801]. The DRS configuration can be received via RRC signaling. The DRS configuration can be configured according to a TP belonging to the TP group. For example, n number of DRS configurations can be provided to the UE in response to n number of TPs. Meanwhile, the UE can receive an indication that n number of TPs are added to a SCell via RRC configuration. The SCell addition indication can be provided together with the DRS configurations or can be separately signaled via RRC. According to one embodiment of the present invention, each of the DRS configurations can be mapped to a FB-configuration-indexes, respectively. For example, n number of DRS configurations can be mapped to m number of FB-configuration-indexes (where m and n are natural numbers).

The UE receives a DRS from the TP 2 using the DRS configuration [S1805]. The UE measures radio resource management (RRM) using the DRS [S1810]. For example, the UE measures at least one of RSRP (reference signal received power), RSSI (received signal strength indicator), and RSRQ (reference signal received quality). The UE reports the RRM measurement to the TP 1 [S1815].

The UE receives an SSPS message from the TP 1 [S1820]. The SSPS message corresponds to a message for indicating a semi-static point switching operation. The SSPS message may correspond to a message for indicating activation of the TP 2 according to a result of the RRM measurement. The SSPS message can be received via a MAC layer or a physical layer.

The UE activates a connection with the TP 2 [S1825]. The TP 2 can be activated as a SCell of the UE. If the TP 2 corresponds to a macro cell, the TP 2 may operate with the TP 2 based on carrier aggregation. If a single physical cell ID is shared between the TP 2 and the TP 2, a connection between the UE and the TP 2 can be activated without radio resource control (RRC) reconfiguration.

If the TP 2 is activated, the UE should perform CSI measurement and report on the TP 2 [S1835, S1840]. To this end, it is necessary for the UE to receive FB-RS (e.g., FB-CSI-RS) of the TP 2 [S1830]. The UE should acquire configuration of the FB-RS first to receive the FB-RS.

According to one embodiment of the present invention, the UE can acquire the FB-RS configuration of the TP 2 by changing a parameter of the DRS configuration of the TP 2 received from the TP 1. Information on a transmission period, transmission offset, number of transmission antennas, and quasi co-location (QCL) assumption of the DRS configuration can be received via a MAC layer or a physical layer.

According to a different embodiment of the present invention, the UE can receive information on a first feedback-configuration-index associated with the DRS of the TP 2 among a plurality of feedback-configuration-indexes configured in advance. The UE identifies FB-RS configuration of the TP 2 via the first feedback-configuration-index and may be then able to receive a FB-RS via the identified FB-RS configuration.

Figure 19:
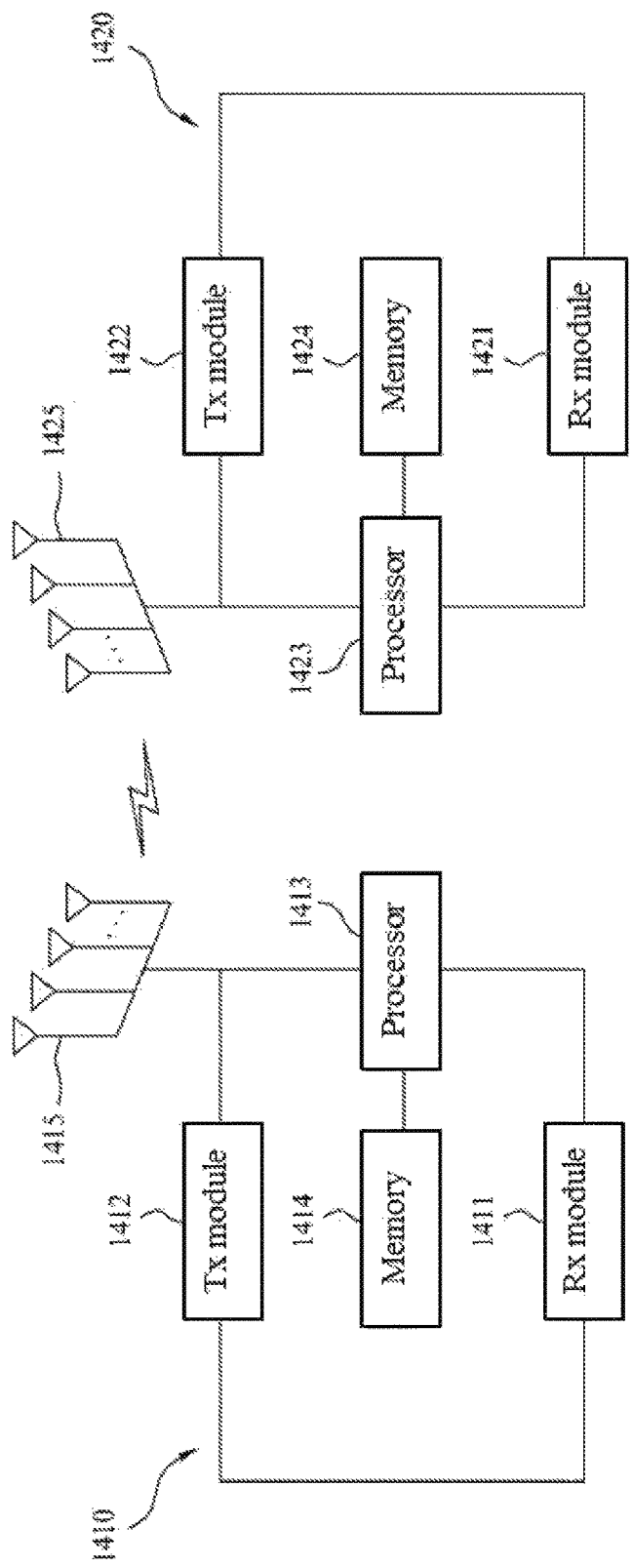
FIG. 19 is a diagram for a user equipment and a base station according to one embodiment of the present invention.

FIG. 19 is a diagram for a user equipment and a base station (or a transmission point) according to one embodiment of the present invention. The user equipment and the base station shown in FIG. 19 can perform operations of the UE and the base station (or the TP) mentioned earlier in the embodiments of the present invention. A base station (BS) 1410 can include a reception module 1411, a transmission module 1412, a processor 1413, a memory 1414 and a plurality of antennas 1415. A plurality of the antennas 1415 correspond to a base station supporting MIMO transmission and reception. The reception module 1411 can receive various signals, data and information from the user equipment in UL. The transmission module 1412 can transmit various signals, data and information to the user equipment in DL. The processor 1413 can control overall operation of the base station 1410.

Besides, the processor 1413 of the base station performs a function of calculating and processing information received by the base station, information to be transmitted to the external and the like. The memory 1414 can store processed information for prescribed time and can be replaced with such a configuration element as a buffer (not depicted).

A user equipment 1420 can include a reception module 1421, a transmission module 1422, a processor 1423, a memory 1424 and a plurality of antennas 1425. A plurality of the antennas 1425 correspond to a UE supporting MIMO transmission and reception. The reception module 1421 can receive various signals, data and information from the base station in DL. The transmission module 1422 can transmit various signals, data and information to the base station in UL. The processor 1423 can control overall operation of the user equipment 1420.

Besides, the processor 1423 of the user equipment 1420 performs a function of calculating and processing information received by the user equipment 1420, information to be transmitted to the external and the like. The memory 1424 can store processed information for prescribed time and can be replaced with such a configuration element as a buffer (not depicted).

The reception module 1421 of the user equipment 1420 according to one embodiment of the present invention receives a DRS from a TP 2 using discovery reference signal (DRS) configuration obtained from a TP 1 (transmission point). The processor 1423 activates a connection with the TP 2 according to a result of radio resource management (RRM) measurement measured on the DRS. The reception module 1421 receives a feedback reference signal (FB-RS) for measuring channel state information (CSI) from the activated TP 2. If a single physical cell ID is shared between the TP 1 and the TP 2, a connection between the user equipment and the TP 2 can be activated without radio resource control (RRC) reconfiguration.

For a concrete configuration of the user equipment and the base station, items mentioned earlier in various embodiments of the present invention can be independently applied or two or more embodiments can be applied at the same time. For clarity, explanation on contents overlapped with the aforementioned contents is omitted.

And, in explaining FIG. 19, if a relay becomes a downlink transmission entity from a base station or an uplink reception entity to the base station, or the relay becomes a downlink reception entity from the UE or an uplink transmission entity to the UE, the principle of the present invention can also be identically applied to the relay via various embodiments of the present invention.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

A specific operation described as performed by a base station may be performed by an upper node of the base station. Namely, it is apparent that, in a network comprised of a plurality of network nodes including a base station, various operations performed for communication with a UE may be performed by the base station, or network nodes other than the base station. The term 'base station' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of transmitting and receiving a signal in a wireless communication system and an apparatus therefor are explained centering on examples applied to 3GPP LTE system, the method and the apparatus can also be applied to various wireless communication systems as well as 3GPP LTE system.

What is claimed is:

1. A method of receiving a reference signal by a user equipment (UE) in a wireless communication system, the method comprising:
   receiving, by the UE, a discovery reference signal (DRS) from a second transmission point (TP) using DRS configuration obtained from a first TP;
   activating, by the UE, a connection with the second TP according to a result of radio resource management (RRM) measurement measured on the DRS; and
   receiving, by the UE, a feedback reference signal (FB-RS) for channel state information (CSI) measurement from the activated second TP based on a FB-RS configuration,
   wherein the CSI measurement is different from the RRM measurement, wherein the UE obtains the FB-RS configuration for the CSI measurement by modifying at least one parameter of the DRS configuration for the RRM measurement, and wherein if a single physical cell ID is shared between the first TP and the second TP, a connection between the user equipment and the second TP is activated without radio resource control (RRC) reconfiguration.

2. The method of claim 1, wherein activating the connection with the second TP comprises:
receiving a semi-static point switching message from the first TP via a medium access control (MAC) layer; and
activating the second TP as a secondary cell (SCell) based on the semi-static point switching message.

3. The method of claim 1, further comprising:
receiving information on a transmission period, a transmission offset, number of transmission antennas, or quasi co-location (QCL) assumption of the DRS configuration, which is changed to obtain the FB-RS configuration of the second TP, via a MAC layer or a physical layer.

4. The method of claim 1, wherein receiving the FB-RS comprises:
receiving information on a first feedback-configuration-index associated with the DRS received from the second TP among a plurality of feedback-configuration-indexes set to the user equipment in advance via radio resource control (RRC),
wherein the FB-RS configuration is identified by the first feedback-configuration-index.

5. The method of claim 1, wherein the second TP belongs to a group of a plurality of TPs sharing the single physical cell ID and wherein a plurality of the TPs belonging to the group of the TPs are activated or deactivated according to a semi-static point switching operation.

6. The method of claim 5, wherein the group of a plurality of the TPs shares at least one of an enhance physical downlink control channel (EPDCCH) configuration, a channel state information (CSI) report configuration, a demodulation reference signal (DMRS) scrambling ID configuration, and a transmission mode.

7. The method of claim 1, wherein the first TP corresponds to a macro cell of the second TP always operating as a primary cell (PCell) in response to the user equipment or a small cell operating as a secondary cell (SCell) of the user equipment which is deactivated according to activation of the second TP.

8. A user equipment receiving a reference signal in a wireless communication system, comprising:
a receiver to receive a discovery reference signal (DRS) from a second transmission point (TP) using DRS configuration obtained from a first TP; and
a processor to activate a connection with the second TP according to a result of radio resource management (RRM) measurement measured on the DRS;
wherein the processor controls the receiver to receive a feedback reference signal (FB-RS) for channel state information (CSI) measurement from the activated second TP based on a FB-RS configuration,
wherein the CSI measurement is different from the RRM measurement,
wherein the processor obtains the FB-RS configuration for the CSI measurement by modifying at least one parameter of the DRS configuration for the RRM measurement, and
wherein if a single physical cell ID is shared between the first TP and the second TP, a connection between the user equipment and the second TP is activated without radio resource control (RRC) reconfiguration.

* * * * *